United States Patent
Tomono

(10) Patent No.: US 10,404,870 B2
(45) Date of Patent: Sep. 3, 2019

(54) IMAGE PROCESSING APPARATUS, SETTING-VALUE SETTING METHOD AND COMPUTER-READABLE RECORDING MEDIUM RECORDING SETTING-VALUE SETTING PROGRAM

(71) Applicant: Konica Minolta, Inc., Chiyoda-ku, Tokyo (JP)

(72) Inventor: Kazuaki Tomono, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/903,471

(22) Filed: Feb. 23, 2018

(65) Prior Publication Data
US 2018/0262634 A1    Sep. 13, 2018

(30) Foreign Application Priority Data
Mar. 8, 2017 (JP) ................................. 2017-044230

(51) Int. Cl.
| | |
|---|---|
| *H04N 1/00* | (2006.01) |
| *G06F 3/12* | (2006.01) |
| *G06T 7/10* | (2017.01) |
| *G06T 1/00* | (2006.01) |
| *H04N 1/40* | (2006.01) |

(52) U.S. Cl.
CPC ....... *H04N 1/00217* (2013.01); *G06F 3/1228* (2013.01); *G06F 3/1258* (2013.01); *G06F 3/1292* (2013.01); *G06T 1/0007* (2013.01); *G06T 7/10* (2017.01); *H04N 1/00095* (2013.01); *H04N 1/40* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2009/0279127 A1 | 11/2009 | Kadiyala | |
| 2013/0257771 A1* | 10/2013 | Tomono .................. | G06F 3/041 345/173 |
| 2014/0029049 A1* | 1/2014 | Takahashi .......... | H04N 1/00973 358/1.15 |

(Continued)

FOREIGN PATENT DOCUMENTS

| | | |
|---|---|---|
| CN | 106165436 | 11/2016 |
| EP | 3 037 954 | 6/2016 |

(Continued)

OTHER PUBLICATIONS

Extended European Search Report issued in corresponding European Patent Application No. 18159145.4-1221, dated Jul. 11, 2018 (7 pages).

(Continued)

*Primary Examiner* — Ngon B Nguyen
(74) *Attorney, Agent, or Firm* — Buchanan Ingersoll & Rooney PC

(57) ABSTRACT

An image processing apparatus that is communicable with a portable device carried by a user includes a hardware processor, the hardware processor executes a process in accordance with a setting value, acquires a terminal image displayed by the portable device from the portable device, analyzes the acquired terminal image, and sets the setting value based on a result of analysis.

26 Claims, 15 Drawing Sheets

(56) References Cited

U.S. PATENT DOCUMENTS

2017/0070624 A1* 3/2017 Hanada ................ G03G 15/502
2017/0142268 A1* 5/2017 Ichiyama ........... H04N 1/00392

FOREIGN PATENT DOCUMENTS

| JP | 7-288668 A | 10/1995 |
| --- | --- | --- |
| JP | 3444956 B2 | 9/2003 |
| JP | 2005-269047 A | 9/2005 |
| JP | 2009-164719 A | 7/2009 |
| JP | 4516770 B2 | 8/2010 |
| JP | 2016-134042 A | 7/2016 |

OTHER PUBLICATIONS

Office Action issued in corresponding Chinese Patent Application No. 201810172994.3, dated May 27, 2019 (18 pages).

* cited by examiner

IMAGE PROCESSING APPARATUS, SETTING-VALUE SETTING METHOD AND COMPUTER-READABLE RECORDING MEDIUM RECORDING SETTING-VALUE SETTING PROGRAM

The entire disclosure of Japanese patent Application No 2017-044230 filed on Mar. 3, 2017 is incorporated herein by reference in its entirety.

BACKGROUND

Technological Field

The preset invention relates to an image processing apparatus, a setting-value setting method and a computer-readable recording medium recording a setting-value setting program. In particular, the present invention relates to an image processing apparatus that can be wirelessly connected to an external device, a setting-value setting method performed by the image processing apparatus and a computer-readable recording medium recording a setting-value setting program executed by the image processing apparatus.

Description of the Related Art

In recent years, a technique, for communicating with an image processing apparatus such as an MFP (Multi Function Peripheral) using a portable device such as a smartphone and a PDA (Personal Digital Assistant) carried by a user and causing the MFP to execute a process with use of data stored in the portable device, has been known. For example, Japanese Patent Laid-Open No. 2016-134042 discloses a technique for transmitting data acquired when the MFP scans a document to a destination address defined in an address book stored in the portable device.

However, in the technique described in Japanese Patent Laid-Open No. 2016-134042, it is necessary to determine steps for communication between the portable device and the MFP in advance. Therefore, there is a problem that destination addresses can be acquired only from a portable device in which a specific application program defining the steps for communication between the MFP and the portable devices is installed.

SUMMARY

According to an aspect of the present invention, an image processing apparatus that is communicable with a portable device carried by a user, including a hardware processor, wherein the hardware processor executes a process in accordance with a setting value, acquires a terminal image displayed by the portable device from the portable device, analyzes the acquired terminal image, and sets the setting value based on a result of analysis.

According to another aspect of the present invention, a setting-value setting method that is performed by an image processing apparatus that is communicable with a portable device carried by a user, the setting-value setting method causing the image processing apparatus to: execute a process in accordance with a setting value, acquire a terminal image displayed by the portable device from the portable device, analyze the acquired terminal image, and set the setting value based on a result of the analysis.

According to yet another aspect of the present invention, a computer-readable recording medium recording a setting-value setting program executed by a computer controlling an image forming apparatus that is communicable with a portable device carried by a user, the setting-value setting program causing the computer to: execute a process in accordance with a setting value, acquire a terminal image displayed by the portable device from the portable device, analyze the acquired terminal image, and set the setting value based on a result of the analysis.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
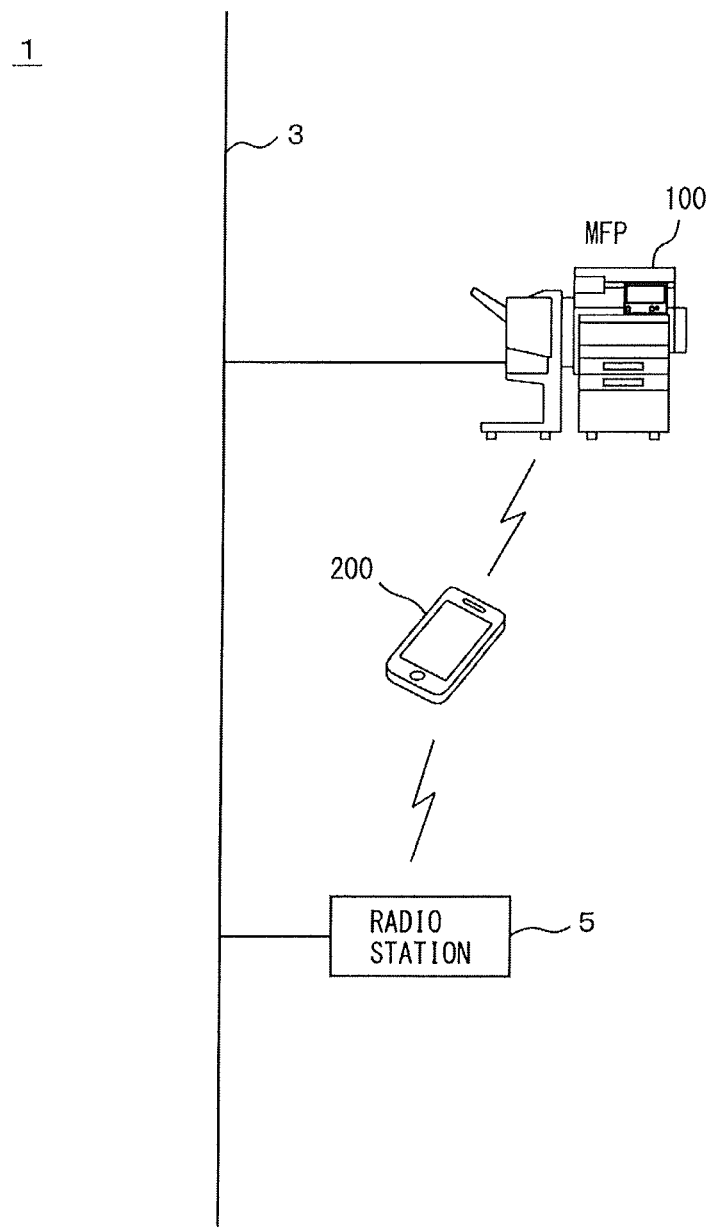
FIG. 1 is a diagram showing one example of an overview of an information system in an embodiment of the present invention.

Hereinafter, one or more embodiments of the present invention will be described with reference to the drawings. However, the scope of the invention is not limited to the disclosed embodiments.

An embodiment of the present invention will be described below with reference to the drawings. In the following description, the same parts are denoted with the same reference characters. Their names and functions are also the same. Thus, a detailed description thereof will not be repeated.

FIG. 1 is a diagram showing one example of an overview of an information system in the embodiment of the present invention. Referring to FIG. 1, the information system 1 includes an MFP (Multi Function Peripheral) 100 and a smartphone 200.

The smartphone 200 is one example of a portable device and is carried and used by a user. A hardware configuration and functions of the smartphone 200 are well known. Thus, a description thereof will not be repeated.

The MFP 100 is one example of an image processing apparatus, and includes a document scanning function for scanning a document, an image forming function for forming an image on a recording medium such as a sheet of paper based on image data and a facsimile transmission reception function for transmitting and receiving facsimile data.

Each of a radio station 5 and the MFP 100 is connected to a network 3. The network 3 is a Local Area Network (LAN), either wired or wireless. Further, the network 3 is not limited to a LAN and may be a network such as a network using Public Switched Telephone Networks. Further, the network 3 may be a Wide Area Network (WAN) such as the Internet.

The smartphone 200 has a wireless LAN function and is communicable with the radio station 5. The radio station 5 is a relay device of the network 3. The radio station 5 communicates with the smartphone 200 including a communication function using a wireless LAN and connects the smartphone 200 to the network 3. Therefore, the smartphone 200 is communicable with the MFP 100 via the radio station 5. The network 3 may further be connected to the Internet. In this case, each of the smartphone 200 and the MFP 100 is communicable with a computer connected to the Internet via the network 3.

Further, each of the MFP 100 and the smartphone 200 has a function of establishing short-range wireless communication and can communicate one-to-one with another device in the case where the other device is within a predetermined range.

Figure 2:
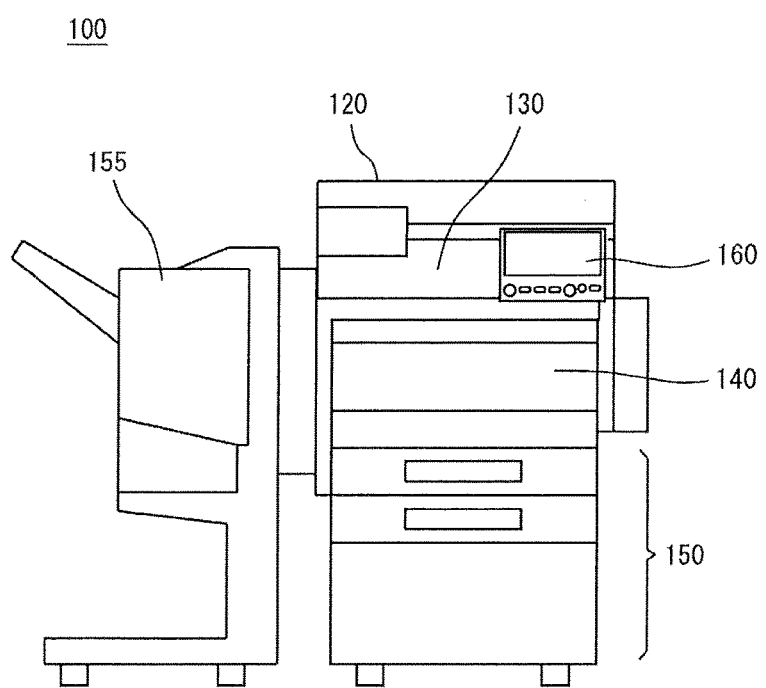
FIG. 2 is a perspective view showing the appearance of an MFP in the present embodiment.
Figure 3:
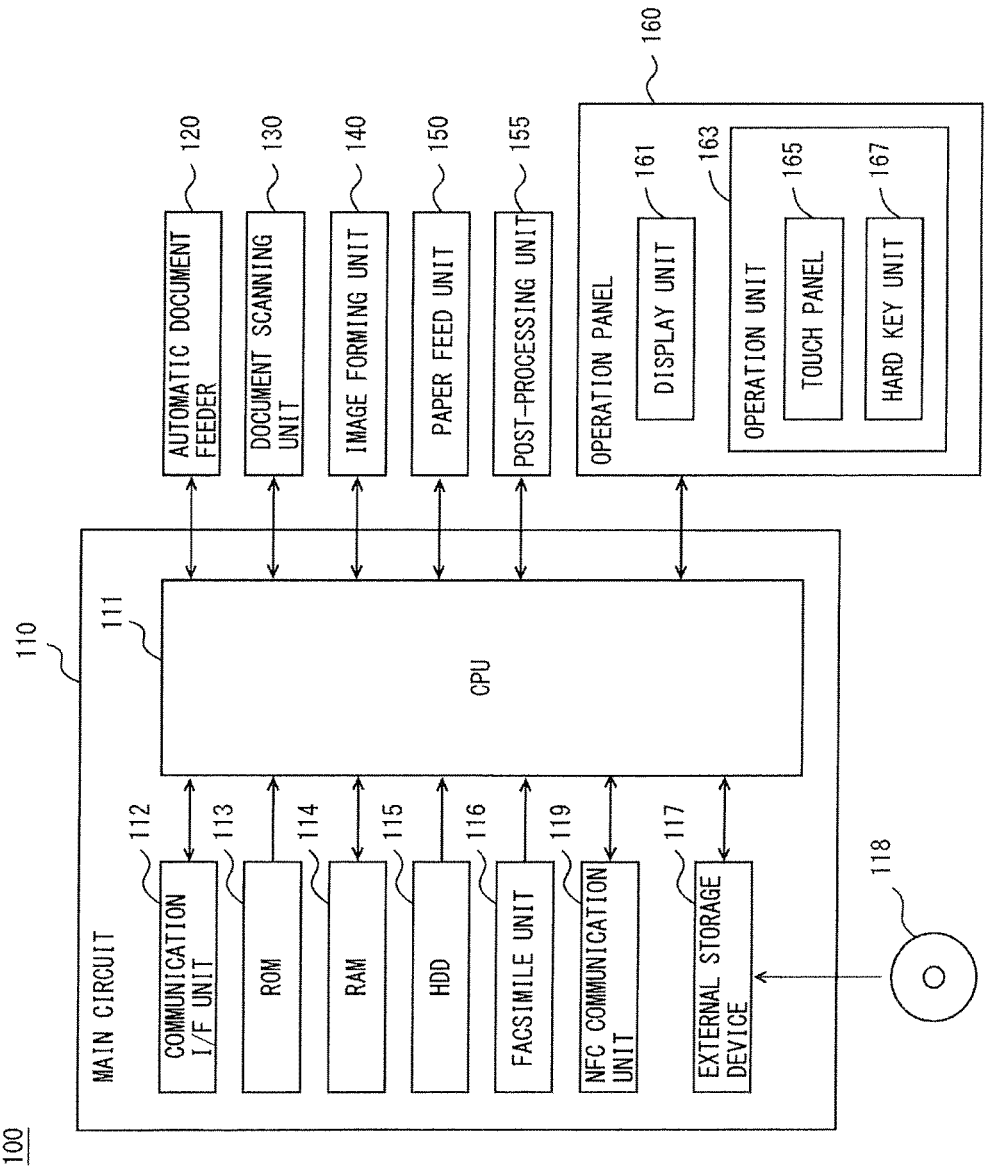
FIG. 3 is a block diagram showing one example of a hardware configuration of the MFP in the present embodiment.

FIG. 2 is a perspective view showing the appearance of the MFP in the present embodiment. FIG. 3 is a block diagram showing one example of a hardware configuration of the MFP in the present embodiment. Referring to FIGS. 2 and 3, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140, a post-processing unit 155 for processing sheets of paper on which images have been formed, and an operation panel 160 serving as a user interface.

The post-processing unit 155 performs a sorting process of sorting and discharging one or more sheets of paper on which images have been formed by the image forming unit 140, a punching process of punching the sheets and a stapling process of stapling the sheets.

The main circuit 110 includes a CPU 111, a communication interface (I/F) unit 112 connected to the CPU 111, a ROM 113, a RAM 114, a Hard Disc Drive (HDD) 115, a facsimile unit 116, and an external storage device 117 and an NFC communication unit 119. The CPU 111 is connected to the automatic document feeder 120, the document scanning unit 130, the image forming unit 140, the paper feed unit 150, the post-processing unit 155, and the operation panel 160 and controls the entire MFP 100.

The ROM 113 stores a program executed by the CPU 111 or data necessary for execution of the program. The RAM 114 is used as a work area when the CPU 111 executes a program. Further, the RAM 114 temporarily stores scan data (image data) successively transmitted from the document scanning unit 130.

The operation panel 160 is provided on the upper surface of the MFP 100 and includes a display unit 161 and an operation unit 163. The display unit 161 is a display device such as a Liquid Crystal Display (LCD) or an organic ELD (Electro-Luminescence Display) and displays instruction menus to users, information about the acquired image data and other information. The operation unit 163 includes a hard key unit 167 including a plurality of keys and accepts input of a variety of instructions and data such as characters and numerals through operations that are performed by the user and correspond to the keys. The operation unit 163 further includes a touch panel 165 provided on the display unit 161.

The HDD 115 is a mass storage device. The communication I/F unit 112 is an interface for connecting the MFP 100 to the network 3. The CPU 111 communicates with the smartphone 200 via the communication I/F unit 112 and transmits and receives data. Further, the communication I/F unit 112 can communicate with a computer connected to the Internet via the network 3.

The facsimile unit 116 is connected to the Public Switched Telephone Networks (PSTN) and transmits facsimile data to or receives facsimile data from the PSTN. The facsimile unit 116 stores the received facsimile data in the HDD 115 or outputs the data to the image forming unit 140. The image forming unit 140 prints the facsimile data received by the facsimile unit 116 on a sheet of paper. Further, the facsimile unit 116 converts the data stored in the HDD 115 into facsimile data, and transmits the facsimile data to a facsimile machine connected to the PSTN.

The external storage device 117 is mounted with a CD-ROM (Compact Disc ROM) 118. The CPU 111 can access the CD-ROM 118 via the external storage device 117. The CPU 111 loads a program, recorded in the CD-ROM 118 that is mounted on the external storage device 117, into the RAM 114 for execution. It is noted that the medium for storing the program executed by the CPU 111 is not limited to the CD-ROM 118. It may be an optical disc (MO (Magnetic Optical Disc)/MD (Mini Disc)/DVD (Digital Versatile Disc)), an IC card, an optical card, and a semiconductor memory such as a mask ROM, an EPROM (Erasable Programmable ROM) and an EEPROM (Electrically EPROM).

Further, the program executed by the CPU 111 is not restricted to the program recorded in the CD-ROM 118, and the CPU 111 may load a program, stored in the HDD 115, into the RAM 114 for execution. In this case, another computer connected to the network 3 may rewrite the program stored in the HDD 115 of the MFP 100, or may additionally write a new program therein. Further, the MFP 100 may download a program from another computer connected to the network 3 and store the program in the HDD 115. The program referred to here includes not only a program directly executable by the CPU 111 but also a source program, a compressed program, an encrypted program or the like.

Figure 4:
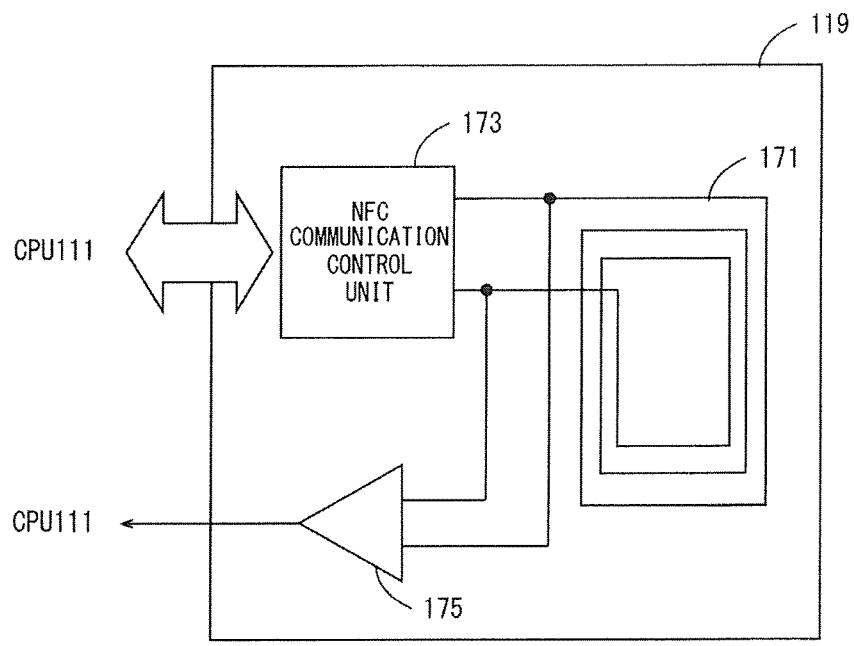
FIG. 4 is a diagram showing one example of a detailed configuration of an NFC communication unit.

FIG. 4 is a diagram showing one example of a detailed configuration of the NFC communication unit. Referring to FIG. 4, the NFC communication unit 119 includes an NFC communication control unit 173, an NFC antenna 171 and a detection circuit 175. The NFC communication control unit 173 is connected to the NFC antenna 171. The NFC communication control unit 173 is controlled by the CPU 111 and wirelessly communicates with an external device, for example, the smartphone 200, using a short-range wireless communication system of NFC (Near Field Communication). A communicable distance for the NFC communication unit 119 is several centimeters. The NFC antenna 171 is arranged on an upper surface or a lower surface of a display surface of the display unit 161. Specifically, the NFC antenna 171 may be formed on a substrate arranged below the display unit 161 or may be arranged above the display surface of the display unit 161. In the case where being arranged above the display surface of the display unit 161, the NFC antenna 171 is formed of a transparent material. Further, in the case where being arranged above the display surface of the display unit 161, the NFC antenna 171 may be arranged between the display unit 161 and the touch panel 165 or may be arranged on the touch panel 165.

In the case where the NFC antenna 171 receives radio waves of a predetermined frequency in order for the NFC communication unit 119 to communicate, the detection circuit 175 outputs a signal, indicating that the NFC communication unit 119 has become communicable with an external device, to the CPU 111.

Figure 5:
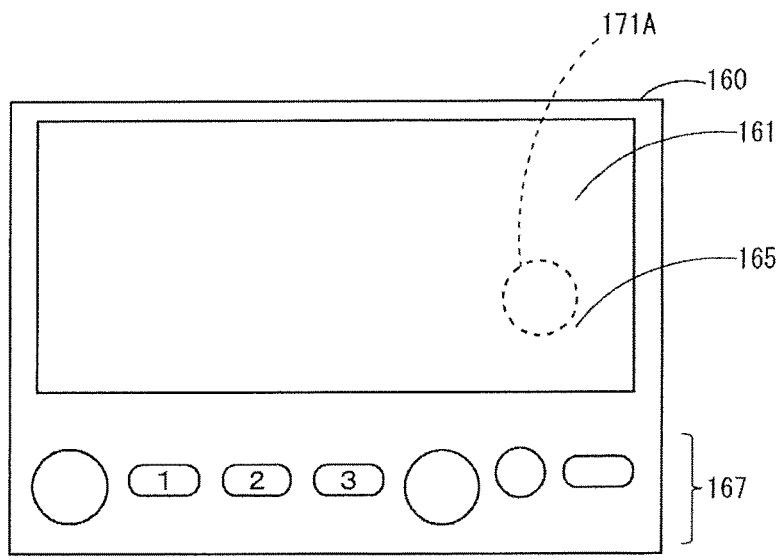
FIG. 5 is a plan view of an operation panel.

FIG. 5 is a plan view of the operation panel. Referring to FIG. 5, the operation panel 160 includes a display unit 161, a touch panel 165 and a hard key unit 167. The display surface of the display unit 161 and a detection surface of the touch panel 165 are superimposed on each other. An antenna region 171A is a region that overlaps with the NFC antenna 171 in the display surface of the display unit 161.

The hard key unit 167 includes a plurality of hard keys. The hard keys are contact switches and are connected to the CPU 111. The hard keys are switched OFF while not being pressed by the user and are switched ON when pressed by the user.

Figure 6:
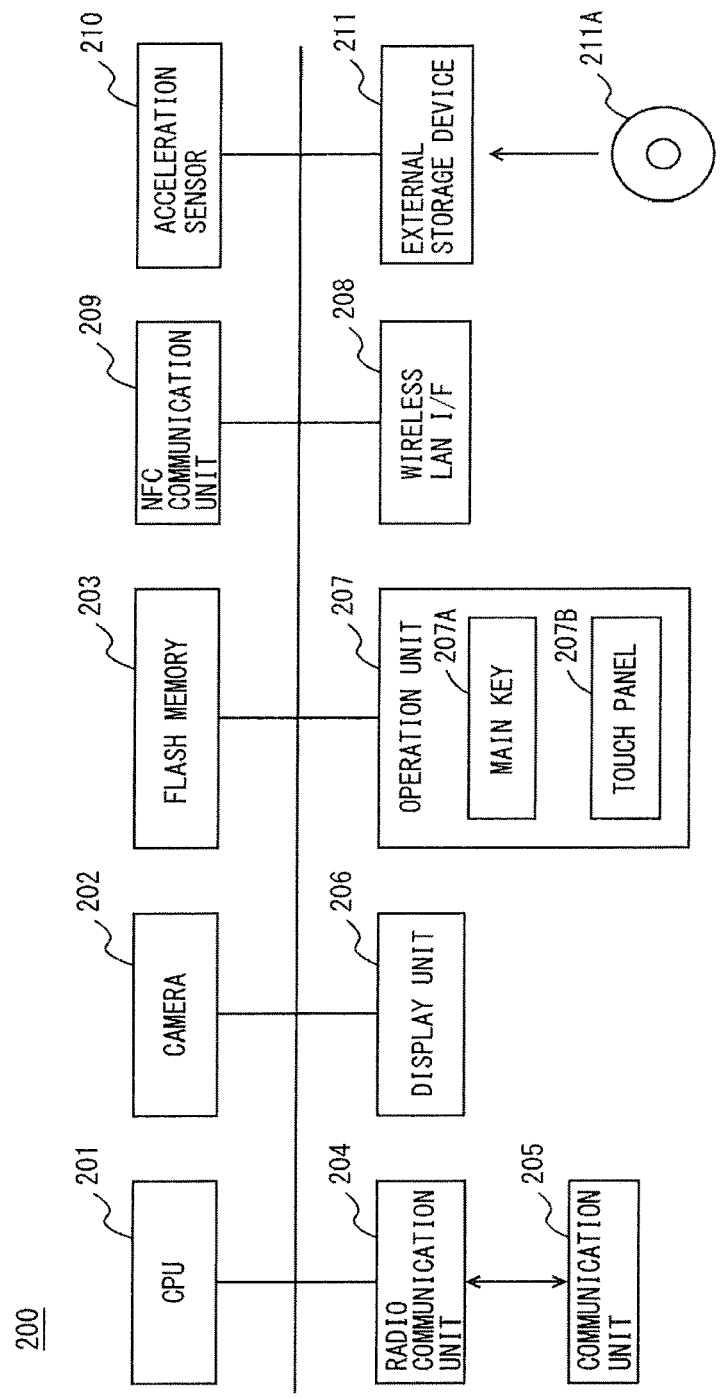
FIG. 6 is a block diagram showing an outline of a hardware configuration of a smartphone in the present embodiment.

FIG. 6 is a block diagram showing an outline of the hardware configuration of the smartphone in the present embodiment. Referring to FIG. 6, the smartphone 200 in the present embodiment includes a CPU 201 for controlling the entire smartphone 200, a camera 202, a flash memory for storing data in a non-volatile manner, a radio wireless communication unit 204 connected to a call unit 205, a display unit 206 for displaying information, an operation unit 207 for accepting operations by the user, a wireless LANI/F 208, an NFC communication unit 209, an acceleration sensor 210 and an external storage device 211.

The display unit 206 is a display device such as a liquid crystal display device (LCD) and an organic ELD for displaying instruction menus to the user, information about the acquired image data, and the like. The operation unit 207 includes a main key 207A and a touch panel 207B. Further, in the case where the user designates a position in the display surface of the display unit 206, the operation unit 207 outputs a position in the display surface detected by the touch panel 207B to the CPU 201. The CPU 201 detects a position designated by the user in the screen displayed in the display unit 206 based on the position detected by the touch panel 207B. The CPU 201 accepts input of a variety of instructions and data such as characters and numerals through the operations by the user based on the screen displayed in the display unit 206 and the position detected by the touch panel 207B. For example, in the case where a screen including an image of ten keys is displayed in the display unit 206, the CPU 201 accepts numerals corresponding to the keys displayed at positions detected by the touch panel 207B.

The camera 202 includes a lens and an optoelectronic transducer and forms an image of light collected by the lens on the optoelectronic transducer. The optoelectronic transducer transduces the received light and outputs the image data to the CPU 201. The optoelectronic transducer is a CMOS (Complementary Metal Oxide Semiconductor) sensor, a CCD (Charge Coupled Device) sensor or the like.

The radio communication unit 204 communicates by radio with the mobile phone base station connected to a telephone communication network. The radio communication unit 204 connects the smartphone 200 to the telephone communication network to enable a call using the call unit 205. The radio communication unit 204 decodes a voice signal obtained by demodulation of a radio signal received from the mobile phone base station and outputs the decoded signal to the call unit 205. Further, the radio communication unit 204 encodes voice input from the call unit 205 and transmits the encoded voice to the mobile phone base station. The call unit 205 includes a microphone and a speaker. The voice input from the radio communication unit 204 is output from the speaker, and the voice input from the microphone is output to the radio communication unit 204. Further, the radio communication unit 204 is controlled by the CPU 201 and connects the smartphone 200 to an email server to transmit and receive emails.

The wireless LANI/F 208 is an interface for communicating with the radio station 5 and connecting the smartphone 200 to the network 3. An IP (Internet Protocol) address of the MFP 100 is registered in the smartphone 200, so that the smartphone 200 can communicate with the MFP 100 and can transmit and receive data.

The NFC communication unit 209 wirelessly communicates with the MFP 100 using a short-range wireless communication system of NFC. When a distance from the MFP 100 is equal to or less than a communicable distance for example, the NFC communication unit 209 communicates with the MFP 100. The communicable distance for the NFC communication unit 209 is several centimeters.

The acceleration sensor 210 is a three-axis acceleration sensor that measures acceleration in three directions of an X axis, a Y axis and a Z axis. The acceleration sensor 210 outputs the detected acceleration to the CPU 201.

The flash memory 203 stores a program executed by the CPU 201 or data required for execution of the program. The CPU 201 loads the program recorded in the flash memory 203 into the RAM included in the CPU 201 for execution.

The external storage device 211 is attachable to and detachable from the smartphone 200. A CD-ROM 211A storing a remote operation program can be mounted on the external storage device 211. The CPU 201 can access the CD-ROM 211A via the external storage device 211. The CPU 201 can load the remote operation program recorded in the CD-ROM 211A mounted on the external storage device 211 into the RAM included in the CPU 201 for execution.

The program recorded in the flash memory 203 or the CD-ROM 211A has been described as a program executed by the CPU 201. However, another computer connected to the network 3 may rewrite the program stored in the flash memory 203 or additionally write a new program therein. Further, the smartphone 200 may download a program from another computer connected to the network 3. The program referred to here includes not only a program directly executable by the CPU 201 but also a source program, a compressed program, an encrypted program and the like.

The program executed by the CPU 201 may be stored not only in the CD-ROM 211A but also in another medium such as an optical disc (MO/MD/DVD), an IC card, an optical card, and a semiconductor memory such as a mask ROM, an EPROM, and an EEPROM.

Figure 7:
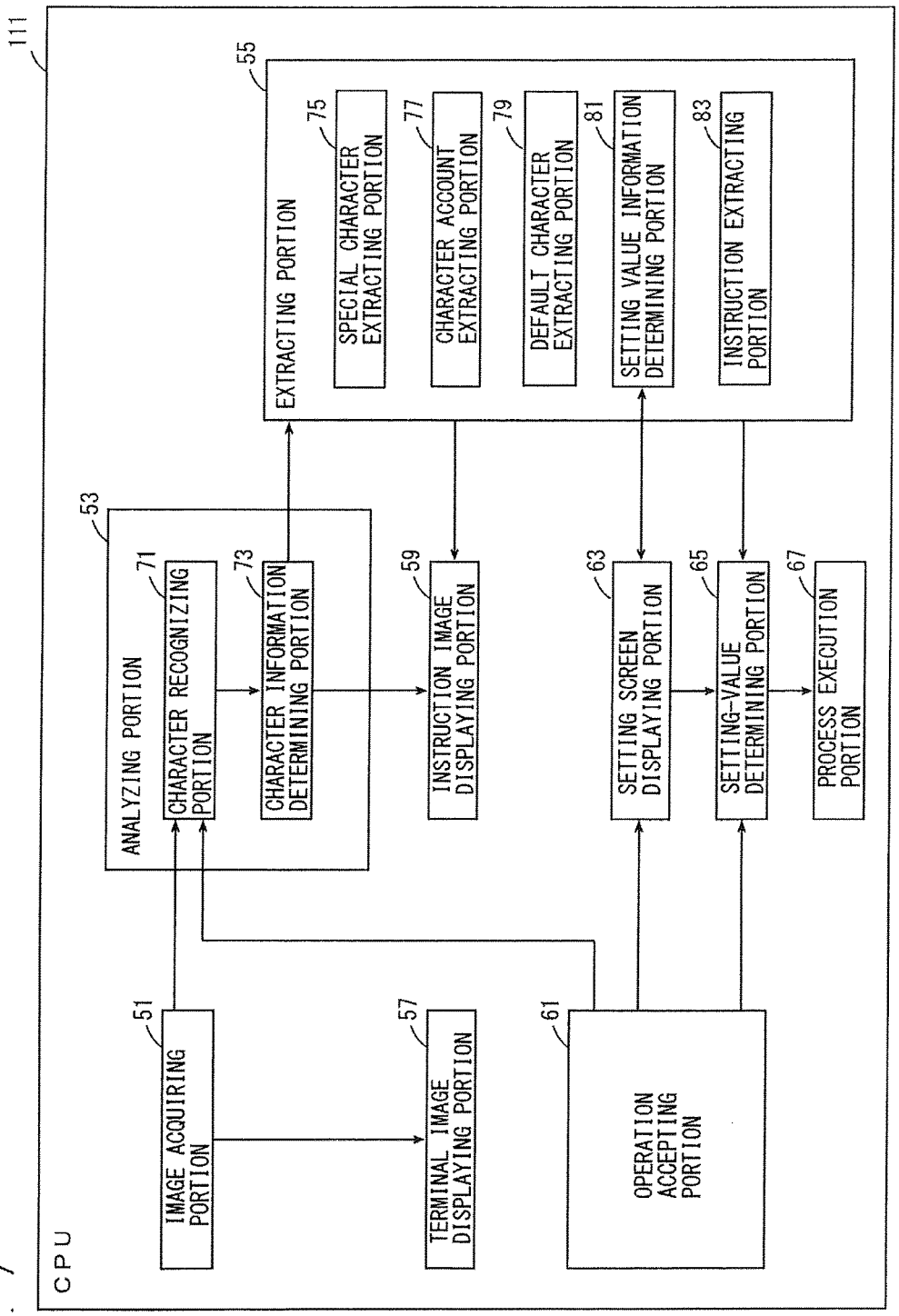
FIG. 7 is a block diagram showing one example of functions of a CPU included in the MFP in the present embodiment.

FIG. 7 is a block diagram showing one example of functions of the CPU included in the MFP in the present embodiment. The functions shown in FIG. 7 are formed in the CPU 111 in the case where the CPU 111 included in the MFP 100 executes a setting-value setting program stored in the ROM 113, the HDD 115 or the CD-ROM 118. Each function of the CPU 111 shown in FIG. 7 executes a predetermined process corresponding to the input and outputs a result of the process. Therefore, each function of the CPU 111 can be realized by an electronic circuit using a relay or the like. Referring to the FIG. 7, the CPU 111 includes an image acquiring portion 51, an analyzing portion 53, an extracting portion 55, a terminal image displaying portion 57, an instruction image displaying portion 59, an operation accepting portion 61, a setting screen displaying portion 63, a setting-value determining portion 65 and a process execution portion 67.

The image acquiring portion 51 communicates with the smartphone 200 and acquires an image displayed in the display unit 206. For example, when detecting that the NFC communication unit 119 has become communicable with another device, the image acquiring portion 51 controls the communication I/F unit 112 and establishes a communication path with the smartphone 200. The frequency of radio waves for the NFC communication unit 119 to communicate with the other device is defined in advance. Therefore, in the case where receiving the radio waves of the predetermined frequency, the NFC communication unit 119 becomes communicable with the other device.

In this stage, in the case where a general application program defining a process of transmitting an image displayed in the display unit 206 is executed in the smartphone 200, the communication I/F unit 112 receives an image transmitted by the smartphone 200. The image acquiring portion 51 acquires the image received by the communication I/F unit 112 from the smartphone 200 as a terminal image. The image acquiring portion 51 outputs the terminal image acquired from the smartphone 200 to the analyzing portion 53 and the terminal image displaying portion 57. Therefore, the smartphone 200 does not have to communicate with the MFP 100 and install a specific application program that is compatible with the specification of the MFP 100 in order for the MFP 100 to acquire the terminal image from the smartphone 200.

The setting screen displaying portion 63 controls the display unit 161 and displays a setting screen stored in the HDD 115 in a predetermined first region in the display surface of the display unit 161. Thus, the user can operate the operation unit 163 and input operations in the MFP 100. The setting screen includes a screen for setting a setting value in order for the user to cause the MFP 100 to execute a process. The setting value is a value used for execution of the process by the process execution portion 67. In response to displaying the setting screen in the display unit 161, the setting screen displaying portion 63 outputs screen identification information for identifying the displayed setting screen to the extracting portion 55 and the setting-value determining portion 65.

In response to reception of the terminal image, the terminal image displaying portion 57 displays the terminal image in the display unit 161. The terminal image displaying portion 57 displays the terminal image in a predetermined second region in the display surface of the display unit 161. The second region does not overlap with the first region.

The operation accepting portion 61 controls the operation unit 163 and accepts an operation of inputting in the operation unit 163 by the user. The operation accepting portion 61 outputs the accepted operation to the analyzing portion 53, the setting screen displaying portion 63 and the setting-value determining portion 65.

In the case where the user inputs a setting value in the operation unit 163 in accordance with the setting screen displayed in the display unit 161, the operation accepting portion 61 accepts a setting operation of setting the setting value. In the case where the setting operation is accepted by the operation accepting portion 61, the setting-value determining portion 65 determines the setting value that is specified by the accepted setting operation. The setting-value determining portion 65 outputs the determined setting value to the process execution portion 67. Specifically, in the case where the user designates a region for the input of the setting value in the setting screen, the touch panel 165 detects a position in the region for the input of the setting value in the setting screen and accepts a region designating operation. When accepting the region designating operation, the setting-value determining portion 65 sets a type, of a setting value corresponding to the region specified by the region designating operation, as a process target. Then, in the case where the user inputs a setting value in the operation unit 163, the setting-value determining portion 65 determines that the setting value accepted by the operation unit 163 is the setting value of the type that is set as the process target. For example, it is determined that a numerical text string that is input when the user operates the hard key unit 167 is a setting value. Further, a keyboard is displayed in the display unit 161, and characters assigned to keys corresponding to positions detected by the touch panel 165 are accepted. Then, the setting-value determining portion 65 determines that a string of the plurality of accepted characters is the setting value.

In the case where the operation accepting portion 61 accepts an execution instructing operation, the process execution portion 67 executes a process in accordance with the setting value determined by the setting-value determining portion 65. In the case where an operation of giving instruction to execute a process is input in the operation unit 163, the operation accepting portion 61 accepts an execution instructing operation. The processes executable by the process execution portion 67 includes a document scanning process, an image forming process, a data transmission reception process, a facsimile transmission reception process and a data management process, for example. The processes executable by the process execution portion 67 include a process that is a combination of at least two of the document scanning process, the image forming process, the data transmission reception process, the facsimile transmission reception process and the data management process. The processes executable by the process execution portion 67 are not limited to these, and may include less types of processes or more types of processes.

The document scanning process is a process of storing image data, which is acquired when the document scanning unit 130 scans a document, in the RAM 114. Setting values used for execution of the document scanning process include whether one side or both sides of the document are to be scanned, whether the document is in color or monochrome, resolution for scanning, image quality, darkness, presence or absence of marks or page numbers, whether a frame that is present around the scanned image is to be deleted, whether an image process such as sharpening is to be executed, a format and a name of a file of image data stored in the RAM 114, a size of the document, the number of documents and a type of the document. The types of the document includes a document in mixed-size and a book document indicating the formation of a plurality of pages.

The image forming process is a process of causing the image forming unit 140 to form an image of data on a sheet of paper that is supplied from the paper feed unit 150. Setting values used for execution of the image forming process include whether an image is printed in color or monochrome, a size of paper, a type of paper, the number of copies, designation of a paper feed tray, absence or presence of a post-process, a side of the sheet on which an image is formed (simplex or duplex) and orientation of a document, for example. The post-processes include sorting, stapling, punching and the like.

The data transmission reception process is a process of receiving data from a computer connected to a network via the communication I/F unit 112, or a process of transmitting data stored in the HDD 115 or the external storage device 117 to the computer connected to the network via the communication I/F unit 112. Setting values used for execution of the data transmission reception process include transmission destination of data, resolution of data, whether the data is in color or monochrome and a file format, for example. The transmission destination of the data includes an email address and an IP (Internet Protocol) address, for example.

The facsimile transmission reception process is a process of causing the facsimile unit 116 to transmit an image of facsimile data, or a process of externally receiving an image of facsimile data. A setting value used for execution of the facsimile transmission reception process includes the facsimile number, for example.

The data management process is a process of storing data in the HDD 115 or the external storage device 117, a process of changing or deleting the data stored in the HDD 115 or the external storage device 117, and a process of selecting one or more pieces of data from among pieces of data stored in the HDD 115 or the external storage device 117 as the data to be processed. The process of changing data includes a process of editing data and a process of changing a format. Setting values used for execution of the data management process are a folder name required for creation of a folder in the HDD 115, a password set for the folder, a search character string for searching data, a type of the folder and the time when the document is to be deleted, for example.

The analyzing portion 53 receives an terminal image from the image acquiring portion 51 and analyzes the terminal image. In response to reception of a start instructing operation by the operation accepting portion 61, the analyzing portion 53 analyzes the terminal image. In the case where the user inputs an operation of instructing the operation unit 163 to start analyzing, the operation accepting portion 61 accepts the start instructing operation. For example, in the case where a terminal image is displayed in the display unit 161 by the terminal image displaying portion 57, the operation accepting portion 61 displays a start instructing button to which a start instruction is assigned in the display unit 161. When a position in the start instructing button is designated by the user, and the touch panel 165 detects the position in the start instructing button, the operation accepting portion 61 accepts the start instructing operation.

Further, in the case where the operation accepting portion 61 accepts the region designating operation, the analyzing portion 53 analyzes a region specified by the region designating operation in the terminal image. In the case where the user inputs an operation of designating a region in the operation unit 163, the operation accepting portion 61 accepts the region designating operation. For example, with the terminal image displayed in the display unit 161 by the terminal image displaying portion 57, when the touch panel 165 detects that any two locations in the terminal image are simultaneously designated by the user, the operation accepting portion 61 accepts the region designating operation of specifying the two simultaneously designated locations by the touch panel 165. Further, in the case where the user inputs a pinch operation of determining a distance between two fingers with the two fingers simultaneously in contact with the detection surface of the touch panel 165, the touch panel 165 specifies the two last detected locations with which the two fingers are respectively in contact and accepts the region designating operation of designating the two locations last detected by the touch panel 165. Further, in the case where the touch panel 165 detects two locations at different time points, the operation accepting portion 61 accepts the region designating operation of specifying two locations detected by the touch panel 165 at different time points.

In the case where the operation accepting portion 61 accepts the region designating operation, the analyzing portion 53 specifies a rectangular region having two locations diagonally located from each other and specified by the region designating operation, and analyzes an image in the specified region in the terminal image. In the case where the operation accepting portion 61 accepts the region designating operation before accepting the start instructing operation, the analyzing portion 53 analyzes the region specified by the region designating operation in the terminal image. In the case where the operation accepting portion 61 has not accepted the region designating operation before accepting the start instructing operation, the analyzing portion 53 analyzes the entire terminal image.

The analyzing portion 53 includes a character recognizing portion 71 and a character information determining portion 73. The character recognizing portion 71 recognizes characters in the terminal image. In the case where the operation accepting portion 61 accepts the region designating operation before accepting the start instructing operation, the character recognizing portion 71 recognizes the characters in the region specified by the region designating operation in the terminal image. In the case where the operation accepting portion 61 has not accepted the region designating operation before accepting the start instructing operation, the character recognizing portion 71 recognizes the characters in the entire terminal image. The analyzing portion 53 extracts images of the characters included in the terminal image, and converts the extracted images of characters into characters. The characters includes alphabets, numerals, hiragana characters, katakana characters, kanji characters and symbols, and are text data. The symbols include "–", "@", "*" and the like. The character recognizing portion 71 outputs a set of characters and position information to the character information determining portion 73. The position information is the information indicating the positions of the images corresponding to the characters in the terminal image.

The character information determining portion 73 determines character information from a set of the characters and the position information received from the character recognizing portion 71. The character information is a string of two or more characters. The character information determining portion 73 determines relative positions of two or more images respectively corresponding to two or more characters based on positions in the terminal image specified by respective pieces of position information of the two or more characters, and determines one piece of character information including the two or more characters respectively corresponding to the two or more images that are located at predetermined relative positions.

The relative positions of the two or more characters that constitute the character information are determined based on the positions of the images corresponding to the characters in the terminal screen. Further, the relative positions of the two or more characters that constitute the character information are defined by a distance between two images respectively corresponding to the two characters and a direction in which the two images are arranged. For example, one piece of character information including two or more characters with no spacing between adjacent two characters is determined. Specifically, in the case where a distance between the two images respectively corresponding to the two characters is equal to or smaller than a size of each of the two images respectively corresponding to the two characters, one piece of character information including at least the two characters is determined. Further, one piece of character information including at least two or more characters arranged in one direction is determined. Specifically, in the case where three or more images respectively corresponding to three or more characters are arranged in one direction, one piece of character information including at least three or more characters is determined. The character information determining portion 73 outputs one or more pieces of determined character information to the instruction image displaying portion 59 and the extracting portion 55.

In response to receiving one or more pieces of character information, the instruction image displaying portion 59 displays instruction images respectively corresponding to the one or more pieces of character information in a portion corresponding to the one or more pieces of character information in the terminal image displayed in the second region of the display unit 161. Here, the instruction image is a rectangular image surrounding a portion corresponding to the character information in the terminal image. The portion corresponding to the character information includes all of a plurality of images respectively corresponding to a plurality of characters that constitute the character information in the terminal image. In the case where receiving a plurality of pieces of character information from the character information determining portion 73, the instruction image displaying portion 59 displays a plurality of instruction images respectively corresponding to the plurality of pieces of character information in the display unit 161.

The extracting portion 55 extracts one or more pieces of character information from among the one or more pieces of character information received from the character information determining portion 73 for each type of a setting value as candidate information. The extracting portion 55 outputs a set of the candidate information and the type of the setting value to the setting-value determining portion 65 for each of the one or more pieces of candidate information extracted for each type of the setting value. The extracting portion 55 includes a special character extracting portion 75, a character count extracting portion 77, a default character extracting portion 79, a setting-value information determining portion 81 and an instruction extracting portion 83.

In response to receiving screen identification information from the setting screen displaying portion 63, the setting-value information determining portion 81 determines a type of a setting value. The setting-value information determining portion 81 determines a type of a setting value that can be accepted in the setting screen specified by the screen identification information. In the case where it is defined that a plurality of setting values are to be accepted in the setting screen, the setting-value information determining portion 81 respectively determines types of the plurality of setting values.

The special character extracting portion 75 extracts character information including a special character as candidate information for the type of the setting value including a predetermined special character. For example, when the type of the setting value is an email address, a special character "@" is included. Therefore, the special character "@" is defined in advance for the type "the email address" of the setting value. The special character extracting portion 75 extracts all pieces of character information including the special character "@" from among the one or more pieces of character information received from the character information determining portion 73 as the candidate information for the type "email address" of the setting value, and outputs a set of the extracted candidate information and the type "email address" of the setting value to the setting-value determining portion 65.

In the case where the type of the setting value including the special character is determined by the setting-value information determining portion 81, the special character extracting portion 75 extracts the character information including a predetermined special character for the type of the setting value including the special character as the candidate information. In the case where the type of the setting value including the special character is not determined by the setting-value information determining portion 81, the special character extracting portion 75 sometimes extract the candidate information for the type of the setting value including the special character. For example, in the case where the type "email address" of the setting value is not determined by the setting-value information determining portion 81, in other words, in the case where the setting screen does not include a region where an email address is to be input, the special character extracting portion 75 extracts the character information including the special character "@" as the candidate information corresponding to the type "the email address" of the setting value including the special character. In the case where the type of the setting value including the special character is not determined by the setting-value information determining portion 81, if the special character extracting portion 75 extracts the candidate information for the type of the setting value including the special character, the special character extracting portion 75 outputs a display instruction to the setting screen displaying portion 63. The display instruction includes the type, of the setting value including the special character, which is the type of the extracted candidate information.

The character count extracting portion 77 extracts character information including a predetermined character count of characters as candidate information for a type of a setting value including the predetermined character count of characters. For example, because a character count for a setting value of the facsimile number is "10", the character count "10" is defined in advance for the type "facsimile number" of the setting value. The character count extracting portion 77 extracts the character information including 10 characters from among the one or more pieces of character information received from the character information determining portion 73 as the candidate information for the type of the setting value including the predetermined character count of characters, and outputs a set of the extracted candidate information and the type "facsimile number" of the setting value to the setting-value determining portion 65.

In the case where the type of the setting value including the predetermined character count of characters is determined by the setting-value information determining portion 81, the character count extracting portion 77 extracts the character information including the predetermined character count of characters as the candidate information for the type of the setting value including the predetermined character count of characters. In the case where the type of the setting value including the predetermined character count of characters is not determined by the setting-value information determining portion 81, the character count extracting portion 77 sometimes extracts the candidate information for the type of the setting value including the predetermined character count of characters. For example, in the case where the type "facsimile number" of the setting value is not determined by the setting-value information determining portion 81, in other words, in the case where the setting screen does not include a region where the facsimile number is to be input, the character count extracting portion 77 extracts the character information including the character count "10" of characters as the candidate information for the type of the setting value including the predetermined character count of characters. In the case where the type of the setting value is not determined by the setting-value information determining portion 81, if the character count extracting portion 77 extracts the candidate information for the type of the setting value including the predetermined character count of characters, the character count extracting portion 77 outputs a display instruction to the setting screen displaying portion 63. The display instruction includes a type, of the setting value including the predetermined character count of characters, which is the type of the extracted candidate information.

The default character extracting portion 79 extracts character information arranged in the vicinity of character information including a default character string, which is a predetermined character string for a type of a setting value, as the candidate information. For example, a setting value for the type "facsimile number" of the setting value is sometimes arranged in the vicinity of a character string "FAX", so that the default character string "FAX" is defined in advance for the type "facsimile number" of the setting value. The default character extracting portion 79 extracts the character information arranged in the vicinity of the character information including the default character string "FAX" from among one or more pieces of character information received from the character information determining portion 73 as the candidate information for the type of the setting value arranged in the vicinity of the default character string, and outputs a set of the extracted candidate information and the type of the setting value arranged in the vicinity of the default character string to the setting-value determining portion 65.

In the case where the type of the setting value arranged in the vicinity of the default character string is determined by the setting-value information determining portion 81, the default character extracting portion 79 extracts the character information arranged in the vicinity of the character information including a predetermined default character string as the candidate information for the type of the setting value arranged in the vicinity of the default character string. In the case where the type of the setting value arranged in the vicinity of the default character string is not determined by the setting-value information determining portion 81, the default character extracting portion 79 sometimes extracts the candidate information for the type of the setting value arranged in the vicinity of the default character string. For example, in the case where the type of the setting value of the facsimile number is not determined by the setting-value information determining portion 81, in other words, in the case where the setting screen does not include a region where the facsimile number is to be input, the character count extracting portion 77 extracts the character information arranged in the vicinity of the character information including the default character string "FAX" as the candidate information. In the case where the type of the setting value arranged in the vicinity of the default character string is not determined by the setting-value information determining portion 81, if the default character extracting portion 79 extracts the candidate information for the type of the setting value arranged in the vicinity of the default character string, the default character extracting portion 79 outputs a display instruction to the setting screen displaying portion 63. The display instruction includes a type, of the setting value arranged in the vicinity of the default character string, which is the type of the extracted candidate information.

In the case where receiving screen identification information from the setting screen displaying portion 63 and then receiving sets of candidate information and a type of a setting value from the extracting portion 55, the setting-value determining portion 65 determines a set including the type that is the same as any one of the types of the setting values defined by the setting screen specified by the screen identification information from among the sets of the candidate information and the setting value received from the extracting portion 55. In the case where one set is selected, the setting-value determining portion 65 determines that the candidate information included in the set is the setting value for the type that makes a set with the candidate information. In other words, in the case where one candidate information corresponds to one type, the setting-value determining portion 65 determines that the candidate information is the setting value for the type.

The setting-value determining portion 65 sometimes sets a type of a setting value to be input by the user. In the case where a region where a setting value is to be input in a setting screen is designated by the user, the setting-value determining portion 65 sets the type of the setting value to be input in the region designated by the user as a process target. In the case where an instruction image displayed by the instruction image displaying portion 59 is designated by the user with the type set as the process target by the setting-value determining portion 65, the instruction extracting portion 83 extracts the character information corresponding to the instruction image from among one or more pieces of character information received from the character information determining portion 73 as the candidate information, and outputs a set of the extracted candidate information and the type, which is the process target, to the setting-value determining portion 65. In the case where the set of the candidate information and the type, which is the process target, is received from the instruction extracting portion 83 with the type, which is the process target, determined, the setting-value determining portion 65 determines that the candidate information is the setting value for the type, which is the process target.

In the case where receiving a display instruction from any one of the special character extracting portion 75, the character count extracting portion 77 and the default character extracting portion 79 included in the extracting portion 55, the setting screen displaying portion 63 determines a setting screen for setting a setting value of a type included in the display instruction from among a plurality of setting screens, and displays the determined setting screen in the first region of the display unit 161.

Figure 8:
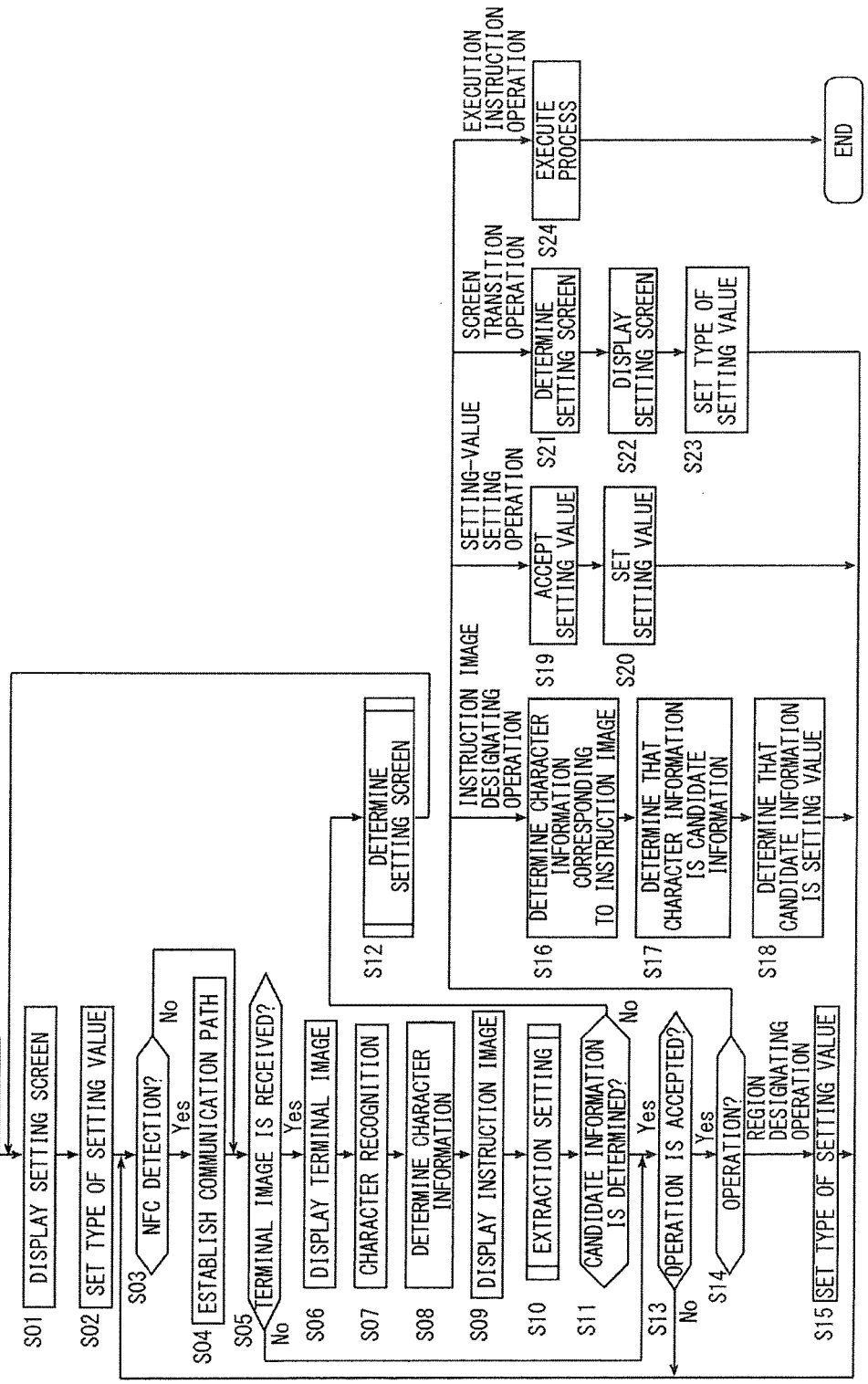
FIG. 8 is a flow chart showing one example of a flow of a setting-value setting process in the present embodiment.

FIG. 8 is a flow chart showing one example of a flow of a setting-value setting process in the present embodiment. The setting-value setting process is a process executed by the CPU 111 in the case where the CPU 111 included in the MFP 100 executes a setting-value setting program stored in the ROM 113, the HDD 115 or the CD-ROM 118. Referring to FIG. 8, the CPU 111 displays the setting screen in the display unit 161 (step S01). The CPU 111 displays one of a plurality of setting screens stored in the HDD 115 in the display unit 161. A predetermined setting screen among the plurality of setting screens may be displayed, or a setting screen defined by an operation of inputting in the operation unit 163 by the user may be displayed. For example, in the case where a hard key to which a setting screen for the copy process is assigned is designated from among a plurality of hard keys included in the hard key unit 167 of the operation unit 163, a setting screen assigned to the hard key is displayed.

In the next step S02, a type of the setting value is set as a process target, and the process proceeds to the step S03. The CPU 111 sets a predetermined type of the setting screen among the one or more types of the setting values to be defined in the setting screen displayed in the display unit 161 in the step S01 as the process target.

In the step S03, the CPU 111 determines whether the NFC communication unit 119 has detected another device. If the NFC communication unit 119 receives radio waves of a predetermined frequency, it is determined that another device has been detected. For example, when the smartphone 200 carried by the user is brought close to the antenna of the NFC communication unit 119, the NFC communication unit 119 detects the radio waves of the frequency transmitted from the smartphone 200. Thus, the smartphone 200 is detected. If the NFC communication unit 119 detects another device, the process proceeds to the step S04. If not, the process proceeds to the step S05. The case where the NFC communication unit 119 detects the smartphone 200 will be described below as an example.

In the step S04, a communication path is established with the device, detected in the step S03, which is the smartphone 200 in this case. For example, the CPU 111 controls the communication I/F unit 112 and establishes the communication path with the smartphone 200. Then, the CPU 111 determines whether a terminal image has been received from the smartphone 200. In the case where an application program for transmitting an image displayed in the display unit 206 is executed in the smartphone 200, the smartphone 200 transmits the image displayed in the display unit 206 via the communication path established in the step S04. Thus, the communication I/F unit 112 receives the image transmitted from the smartphone 200 as the terminal image. If the communication I/F unit 112 has received the terminal image, the process proceeds to the step S06. If not, the process proceeds to the step S13. In the case where the communication path is not established with the smartphone 200 in the step S04, the CPU 111 cannot communicate with the smartphone 200. Thus, the process proceeds to the step S13.

In the step S06, the terminal image is displayed in the second region of the display unit 161, and the process proceeds to the step S07. In the step S07, characters in the terminal image are recognized, and the process proceeds to the step S08. In the case where a partial region in the terminal image is designated by the user, characters in the region designated by the user in the terminal image are recognized. Further, a start button may be superimposed on the terminal image, and the characters may be recognized in response to the designation of the start button by the user.

In the step S08, the CPU 111 determines the character information. The CPU 111 determines the character information, which is a group of a plurality of successive characters extracted from the terminal image by the character recognition. The CPU 111 determines the character information including the plurality of characters that belong to the same group based on positions of the images corresponding to the characters in the terminal image. The CPU 111 determines that the plurality of characters belong to the same group based on a relative positional relationship among the plurality of images respectively corresponding to the plurality of characters. The relative positional relationship is defined by distances between adjacent two images of the plurality of images and an arrangement direction. Specifically, the CPU 111 determines that the plurality of characters respectively corresponding to the plurality of images arranged in the one direction at predetermined intervals belong to the same group and constitutes the character information.

In the step S09, an instruction image corresponding to the character information is displayed in the display unit 161. The instruction image corresponds to the character information and surrounds the images corresponding to the plurality of characters that constitute the character information. Here, the instruction image is a red rectangular image. Therefore, the instruction image is an image defining the size and a position in the terminal image.

In the step S10, the CPU 111 executes an extraction setting process, and the process proceeds to the step S11. While details of the extraction setting process will be described below, the extraction setting process is a process of determining the candidate information, which is a candidate for the setting value, from the character information extracted from the terminal image, and setting a setting value for each type, of the setting value, defined in the operation screen. In the step S11, as a result of execution of the extraction setting process, it is determined whether the candidate information has been determined. If the candidate information has been determined, the process proceeds to the step S13. If not, the process proceeds to the step S12. The case where the candidate information is not determined in the extraction setting process is the case where the character information, which is a candidate for the setting value to be set in the setting screen displayed in the display unit 161 in the step S01, is not present in the terminal image. In the step S12, the CPU 111 executes a setting screen determining process, and the process returns to the step S01. The details of the setting screen determining process will be described below.

In the step S13, the CPU 111 determines whether an operation has been accepted. If the operation unit 163 has accepted the operation of inputting by the user, the process proceeds to the step S14. If not, the process returns to the step S03. In the step S14, the process branches depending on a type of the operation. If the operation input by the user is the region designating operation, the process proceeds to the step S15. If the operation input by the user is an instruction image designating operation of designating an instruction image, the process proceeds to the step S16. If the operation input by the user is the setting-value setting operation of setting a setting value, the process proceeds to the step S19. If the operation input by the user is a screen transition operation of switching a setting screen to another setting screen, the process proceeds to the step S21. If the operation input by the user is the execution instructing operation of instructing the execution of a process, the process proceeds to the step S24.

A type, of the setting value, which is a process target is determined in the step S15, and the process returns to the step S03. The CPU 111 specifies the type of the setting value set in a region specified by the region designating operation from among regions for setting the setting values included in the setting screen displayed in the display unit 161, and sets the specified type as the process target.

In the step S16, the CPU 111 determines the character information corresponding to the instruction image. In the next step S17, the CPU 111 determines that the character information is the candidate information for the type, of the setting value, which is set as the process target. Then, the CPU 111 determines that the candidate information is the setting value (step S18), and the process returns to the step S03. In the case where the candidate information is determined as the setting value, the candidate information determined as the setting value is displayed in a region where the setting value is to be input and which is set as the process target in the setting screen displayed in the display unit 161.

In the step S19, the CPU 111 accepts the setting value defined by the setting-value setting operation, and the process proceeds to the step S20. In the step S20, the CPU 111 sets the setting value accepted in the step S19 as the setting value of the type, which is set as the process target, and the process returns to the step S03. In the case where the setting value is set, the setting value accepted in the step S19 is displayed in a region where the setting value is input and which is set as the process target in the setting screen displayed in the display unit 161.

In the step S21, the CPU 111 determines a setting screen specified by the screen transition operation. The screen transition operation is accepted in the case where a screen transition button included in the setting screen is designated by the user, for example. The screen transition button is associated with the setting screen. In this case, the CPU 111 selects the setting screen associated with the screen transition button designated by the user. In the step S22, the setting screen determined in the step S21 is displayed in the first region of the display unit 161, and the process proceeds to the step S23. In the step S23, the CPU 111 sets one of a plurality of types of the setting values defined in the setting screen determined in the step S21 as a process target, and the process returns to the step S03. In the step S24, the CPU 111 executes the process specified by the execution instructing operation in accordance with the setting value, and the process ends.

Figure 9:
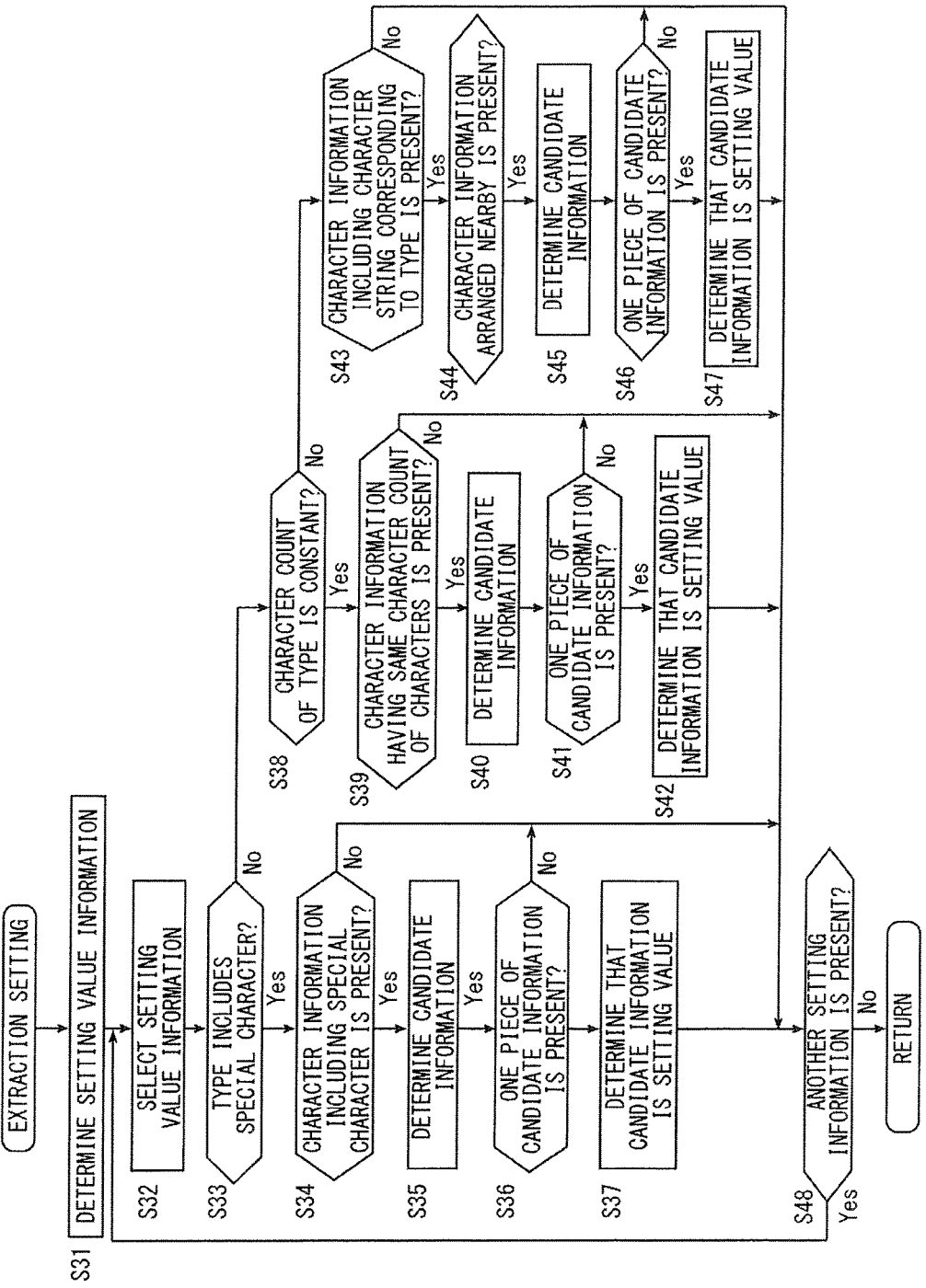
FIG. 9 is a flow chart showing one example of a flow of an extraction setting process.

FIG. 9 is a flow chart showing one example of a flow of the extraction setting process. The extraction setting process is a process executed in the step S10 of FIG. 8. Referring to FIG. 9, the CPU 111 determines the setting value information. The setting value information is the information indicating a type of a setting value. The type, of the setting value, which can be accepted in the setting screen displayed in the display unit 161 is determined as the setting value information. In the next step S32, the CPU 111 selects one piece of setting value information from among the pieces of setting value information determined in the step S31 as a process target, and the process proceeds to the step S33.

In the step S33, the CPU 111 determines whether the type, of the setting value, indicated by the setting value information includes a special character. For example, in the case where the type of the setting value is an email address, "@" is included as a special character. If the special character is included, the process proceeds to the step S34. If not, the process proceeds to the step S38. In the step S34, the CPU 111 determines whether the character information including the special character is present. One or more pieces of character information is determined in the step S08 from the terminal image received from the smartphone 200. If the character information including the special character is present among the one or more pieces of character information, the character information including the special character is determined as the candidate information, and the process proceeds to the step S35. If not, the process proceeds to the step S48. For example, in the case where the setting value information selected in the step S32 indicates an email address as the type of the setting value, if the character information including the special character "@" is extracted from the terminal image, the process proceeds to the step S35. In the step S35, the CPU 111 determines that the character information including the special character "@" is the candidate information for the type, of the setting value, indicated by the setting value information selected in the step S32, and the process proceeds to the step S36.

In the step S36, the CPU 111 determines whether one piece of candidate information is present for the type, of the setting value, indicated by the setting value information selected in the step S32. If the one piece of candidate information is present, the process proceeds to the step S37. If not, the process proceeds to the step S48. In the step S37, the CPU 111 determines that the candidate information is the setting value for the type, of the setting value, indicated by the setting value information selected in the step S32, and the process proceeds to the step S48. In the case where the candidate information is determined as the setting value, the candidate information determined as the setting value is displayed in a region where a setting value for the type, of the setting value, indicated by the setting value information selected in the step S32 is to be input in the setting screen displayed in the display unit 161.

In the step S38, the CPU 111 determines whether the character count of the setting value of the type indicated by the setting value information is constant. For example, in the case where the type of the setting value is the facsimile number, the character count of the facsimile number is "10" and constant. If the character count is constant, the process proceeds to the step S39. If not, the process proceeds to the step S48. In the step S39, the CPU 111 determines whether the character information, including the same character count of characters as the character count defined by the type, of the setting value, indicated by the setting value information, is present. If the character information, including the same character count of characters as the character count defined by the type of the setting value, is present among one or more pieces of character information determined by the terminal image received from the smartphone 200, the process proceeds to the step S40. If not, the process proceeds to the step S48. For example, in the case where the setting value information selected in the step S32 indicates the facsimile number as the type of the setting value, if the character information including the character count "10" of characters is extracted from the terminal image, the process proceeds to the step S40. In the step S40, the CPU 111 determines that the character information including the same character count of characters as the character count defined by the type of the setting value is the candidate information, and the process proceeds to the step S41.

In the step S41, the CPU 111 determines whether one piece of candidate information for the type, of the setting value, indicated by the setting value information selected in the step S32 is present. If the one piece of candidate information is present, the process proceeds to the step S42. If not, the process proceeds to the step S48. In the step S42, the CPU 111 determines that the candidate information is the setting value for the type, of the setting value, indicated by the setting value information selected in the step S32, and the process proceeds to the step S48. In the case where the candidate information is determined as the setting value, the candidate information determined as the setting value is displayed in a region where a setting value for the type, of the setting value, indicated by the setting value information selected in the step S32 is to be input in the setting screen displayed in the display unit 161.

In the step S43, the CPU 111 determines whether the character information including a predetermined character string is present for the type, of the setting value, indicated by the setting value information. If the character information including a predetermined character string for the type, of the setting value, indicated by the setting value information is present, the character information is extracted, and the process proceeds to the step S44. If not, the process proceeds to the step S48. For example, in the case where the type of the setting value is the facsimile number, the character string "FAX" is defined in advance. If the character information including the character string "FAX" is present among the one or more pieces of character information determined by the terminal image received from the smartphone 200, the character information is extracted, and the process proceeds to the step S44. Further, in the case where the type of the setting value is an email address, the character string "email" is defined in advance. If the character information including the character string "email" is present among the one or more pieces of character information determined by the terminal image received from the smartphone 200, the character information is extracted, and the process proceeds to the step S44.

In the step S44, the CPU 111 determines the character information arranged in the vicinity of the character information extracted in the step S43, and the process proceeds to the step S45. The CPU 111 determines whether another piece of character information is present within a predetermined range from the character information extracted in the step S43. If another piece of character information is present, the process proceeds to the step S45. If not, the process proceeds to the step S48.

In the step S45, the character information arranged in the vicinity of the character information extracted in the step S43 is determined as the candidate information for the type, of the setting value, indicated by the setting value information selected in the step S32, and the process proceeds to the step S46. For example, in the case where the type of the setting value is the facsimile number, the character information arranged in the vicinity of the character information including the character string "FAX" is considered to be the facsimile number, and is determined as the candidate information. Further, in the case where the type of the setting value is the email address, the character information arranged in the vicinity of the character information including the character string "email" is considered to be an email address, and determined as the candidate information.

In the step S46, the CPU 111 determines whether one piece of candidate information is present for the type, of the setting value, indicated by the setting value information selected in the step S32. If one piece of candidate information is present, the process proceeds to the step S47. If not, the process proceeds to the step S48. In the step S47, the candidate information is determined as the setting value, and the process proceeds to the step S48. In the case where the candidate information is determined as the setting value, the candidate information determined as the setting value is displayed in a region where the setting value for the type, of the setting value, indicated by the setting value information selected in the step S32 is input in the setting screen displayed in the display unit 161.

In the step S48, the CPU 111 determines whether the setting value information that is not selected as a process target in the step S32 is present. If the unselected setting value information is present, the process returns to the step S32. If not, the process returns to the setting-value setting process.

Figure 10:
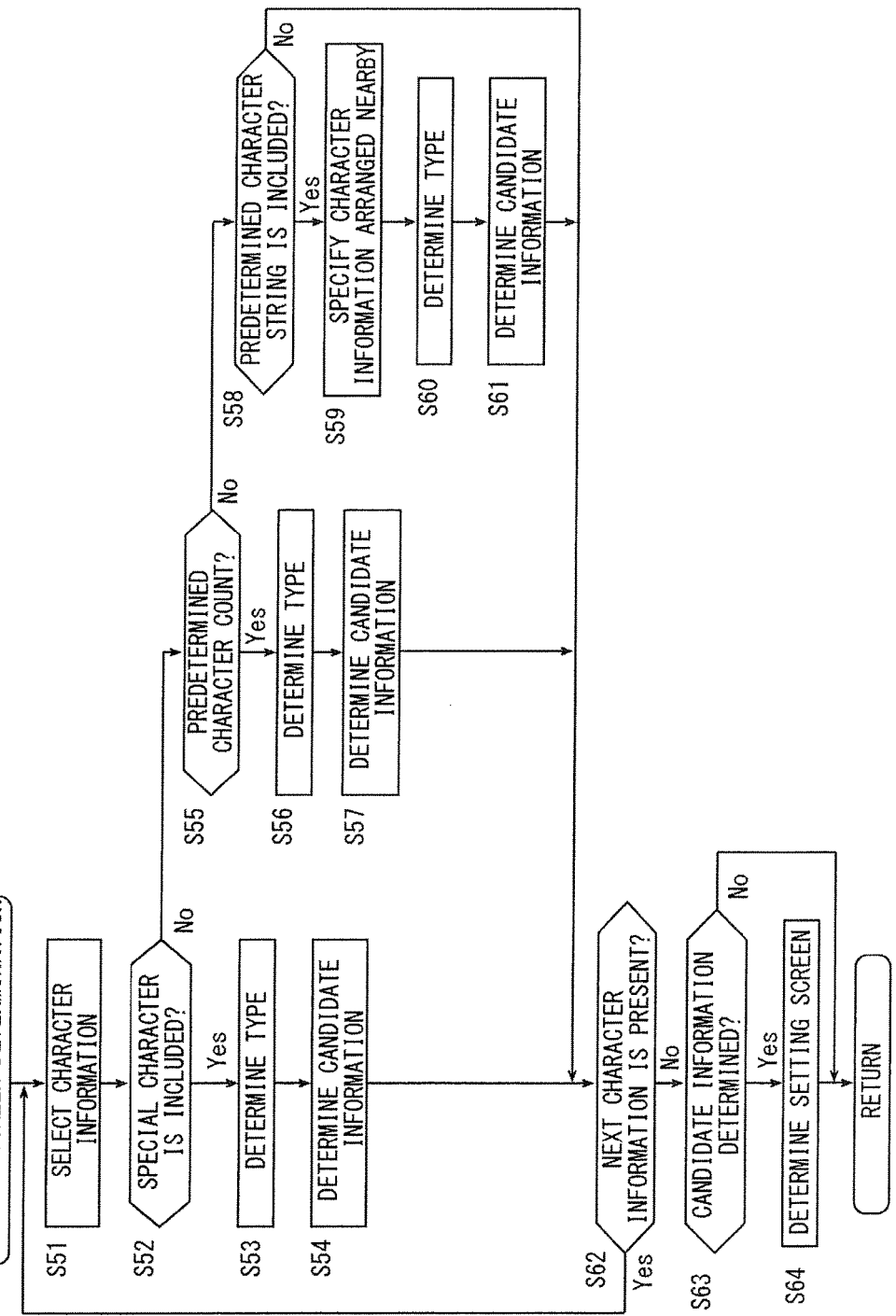
FIG. 10 is a flow chart showing one example of a flow of a setting screen determining process.

FIG. 10 is a flow chart showing one example of a flow of the setting screen determining process. The setting screen determining process is a process performed in the step S12 of FIG. 8. The character information is determined in the step S08, which is a stage prior to the step S12. Referring to FIG. 10, the CPU 111 selects one piece of character information from among pieces of character information as a process target (step S51). In the case where the instruction image is designated by the user, the CPU 111 selects the character information corresponding to the designated instruction image as the process target. In the case where an instruction image is not designated by the user, the CPU 111 may select any one of them. In the next step S52, the CPU 111 determines whether the piece of character information selected as the process target includes a special character. If the character information includes a special character, the process proceeds to the step S53. If not, the process proceeds to the step S55. For example, the special character "@" is defined for the type "email address" of the setting value. If the character information includes the special character "@", the process proceeds to the step S53. In the step S53, the CPU 111 determines the type, of the setting value, corresponding to the special character, and the process proceeds to the step S54. In the case where the special character is "@", the CPU 111 determines that the type of the setting value is an email address. In the step S54, the character information selected as the process target in the step S51 is determined as the candidate information for the type of the setting value determined in the step S53, and the process proceeds to the step S62.

In the step S55, the CPU 111 determines whether the character count of the character information selected as the process target is a predetermined character count. If the character count of the character information selected as the process target is the predetermined character count, the process proceeds to the step S56. If not, the process proceeds to the step S58. For example, in the case where the type of the setting value is the facsimile number, the character count of the facsimile number is "10" and constant. If the character count of the character information is "10", which is the same as the predetermined character count of the facsimile number, the process proceeds to the step S56. Also, in the case where the type of the setting value is the facsimile number, a condition that the character information is in numerals may be added. In the step S56, the CPU 111 determines the type, of the setting value, corresponding to the predetermined character count, and the process proceeds to the step S54. In the case where the character count is "10", the CPU 111 determines that the type of the setting value is the facsimile number. In the step S57, the CPU 111 determines that the character information selected as the process target in the step S51 is the candidate information for the type, of the setting value, determined in the step S56, and the process proceeds to the step S62.

In the step S58, the CPU 111 determines whether the character information selected as the process target includes a predetermined character string. If the character information selected as the process target includes the predetermined character string, the process proceeds to the step S59. If not, the process proceeds to the step S62. For example, the character string "FAX" is defined in advance for the type "facsimile number" of the setting value. If the character information includes the predetermined character string "FAX" of the facsimile number, the process proceeds to the step S59. Further, the character string "email" is defined in advance for the type "email address" of the setting value. If the character information includes the predetermined character string "email" of the email address, the process proceeds to the step S59. In the step S59, the CPU 111 specifies the character information arranged in the vicinity of the character information. Then, the CPU 111 determines the type, of the setting value, corresponding to the predetermined character string (step S60). If the predetermined character string is "FAX", it is determined that the type of the setting value is the facsimile number. If the predetermined character string is "email", it is determined that the type of the setting value is an email address. In the next step S61, the CPU 111 determines that the character information arranged in the vicinity of the character information selected as the process target in the step S51 is the candidate information for the type, of the setting value, determined in the step S60, and the process proceeds to the step S62.

In the step S62, the CPU 111 determines whether the character information not selected as the process target in the step S51 is present. If the unselected character information is present, the process returns to the step S51. If not, the process proceeds to the step S63. In the step S63, the CPU 111 determines whether the candidate information has been determined. If the candidate information has been determined, the process proceeds to the step S64. If not, the process returns to the setting-value setting process. In the step S64, the CPU 111 determines the setting screen for defining the type, of the setting value, corresponding to the candidate information, and the process returns to the setting-value setting process.

Here, returning to FIG. 8, the setting information, the candidate information and the setting screen are determined when the setting screen determining process is executed in the step S12. In the next step S01, the CPU 111 displays the setting screen, which is determined by the setting screen determining process and in which the candidate information determined by the setting screen determining process is displayed in a region where the setting value for the type, of the setting value, indicated by the setting value information determined by the setting screen determining process is input, in the display unit 161. Then, the processes in the step S02 and the subsequent steps are performed for a setting screen newly displayed in the display unit 161. In the case where the setting screen is not determined by the setting screen determining process, the step S01 is not performed, but the processes in the step S03 and the subsequent steps may be performed.

Figure 11:
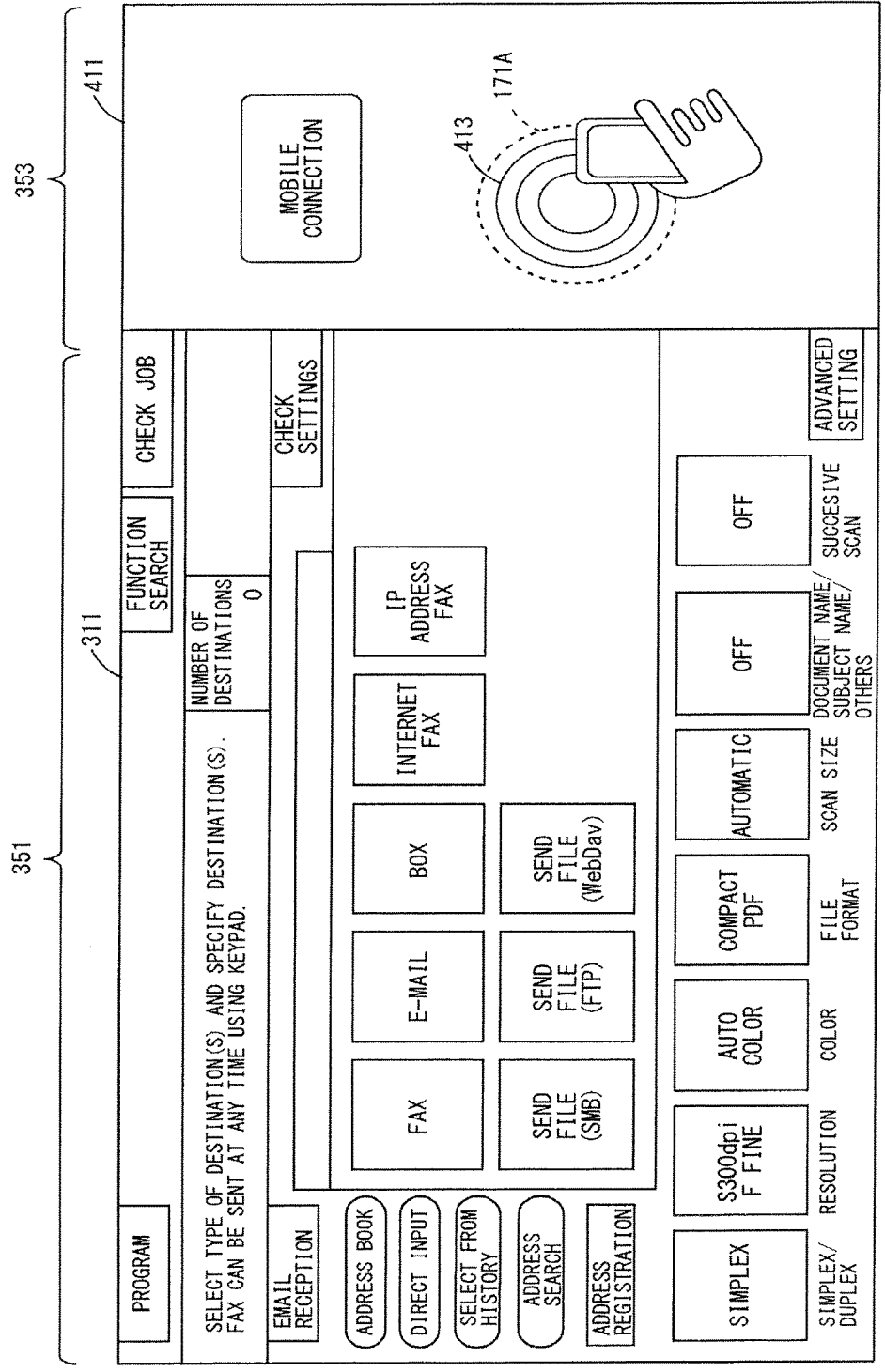
FIG. 11 is a first diagram showing one example of an image displayed in the MFP.

FIG. 11 is a first diagram showing one example of an image displayed in the MFP. Referring to FIG. 11, the display unit 161 includes a first region 351 and a second region 353. A setting screen 311 is displayed in the first region 351, and a terminal image 411 is displayed in the second region 353. The setting screen 311 includes a plurality of transition buttons respectively associated with a plurality of other setting screens. For example, a transition button in which "FAX" is displayed is associated with the setting screen for setting the facsimile number, and a transition button in which "E-mail" is displayed is associated with the setting screen for setting the email address.

The terminal image 411 is a screen for notifying the user that the MFP can operate in cooperation with a mobile device, and includes an indication image 413 arranged in an antenna region 171A. The indication image 413 is an indication indicating a position of the NFC antenna 171. The user may bring the smartphone 200 close to the position at which the indication image 413 is displayed in order to cause the smartphone 200 and the MFP 100 to operate in cooperation with each other. Thus, the user can easily cause the smartphone 200 and the MFP 100 to operate in cooperation with each other.

Figure 12:
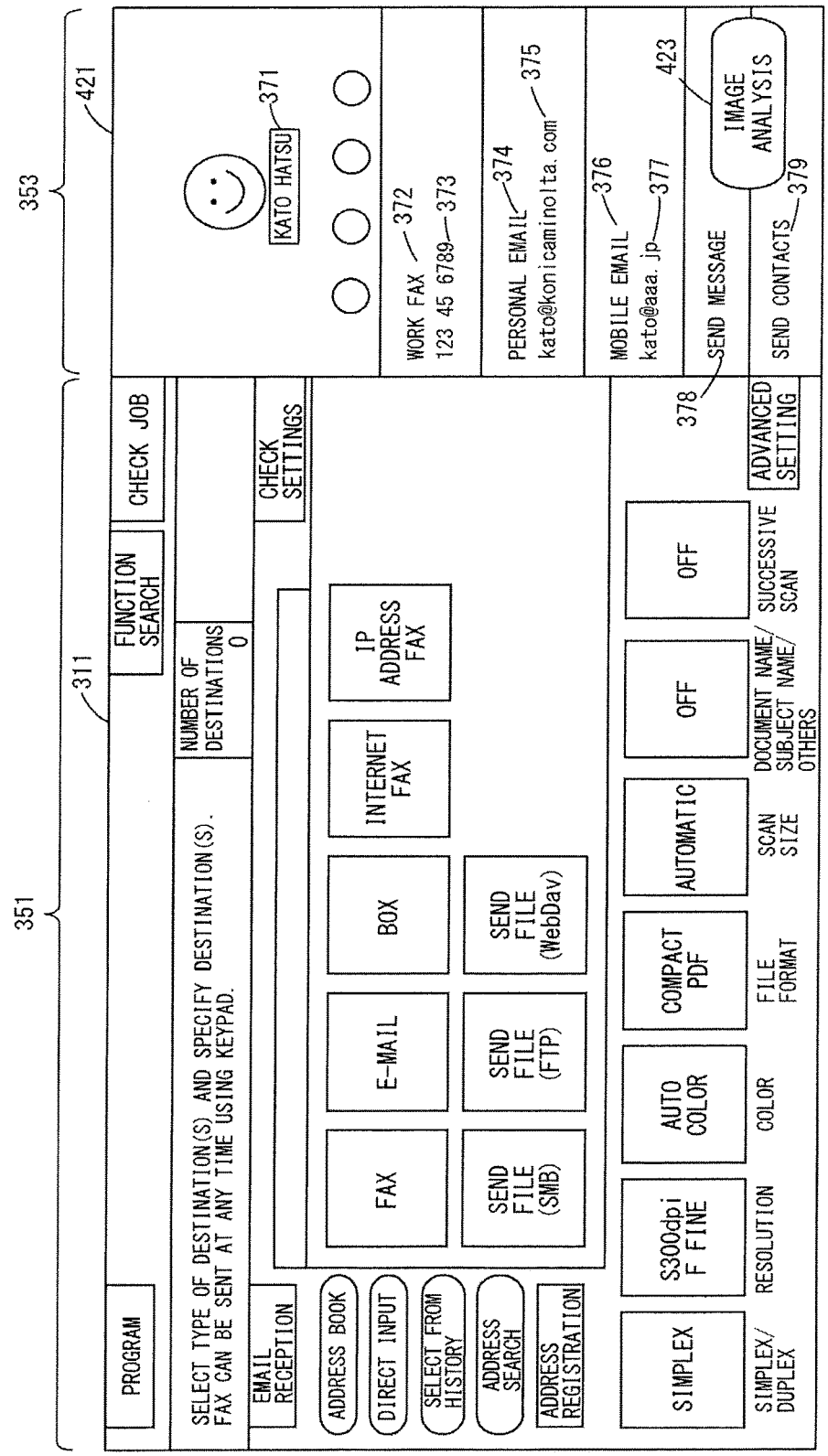
FIG. 12 is a second diagram showing one example of an image displayed in the MFP.

FIG. 12 is a second diagram showing one example of an image displayed in the MFP. In FIG. 12, with the image shown in FIG. 11 displayed in the display unit 161, an image displayed after the smartphone 200 is brought close to the position of the indication image 413 is shown. Referring to FIG. 12, a setting screen 311 is displayed in the first region 351 of the display unit 161, and a terminal image 421 and a start button 423 are displayed in the second region of the display unit 161. The setting screen 311 is the image that is the same as the image displayed in the first region 351 shown in FIG. 11. The terminal image 421 is an image that is the same as an image displayed in the display unit 206 of the smartphone 200. The terminal image 421 includes 9 pieces of character information 371 to 379 including character strings. The start button 423 is representing string "IMAGE ANALYSIS" and superimposed on the terminal image 421. The terminal image 421 is analyzed when the user designates the start button 423.

Figure 13:
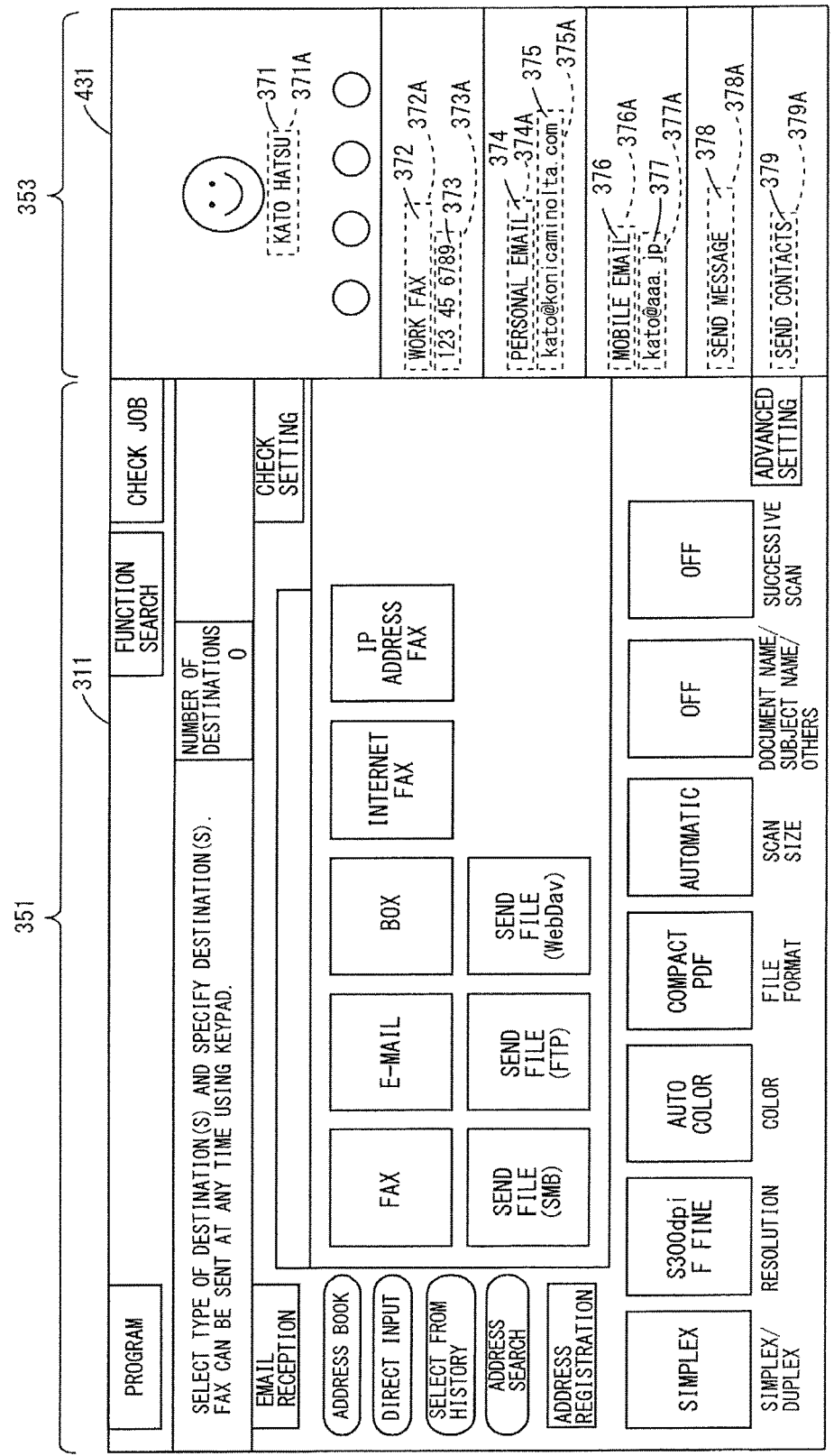
FIG. 13 is a third diagram showing one example of an image displayed in the MFP.

FIG. 13 is a third diagram showing one example of an image displayed in the MFP. In FIG. 13, with the image shown in FIG. 12 displayed in the display unit 161, an image displayed in the display unit 161 after the start button 423 is designated by the user is shown. Referring to FIG. 13, the setting screen 311 is displayed in the first region 351 of the display unit 161, and the terminal image 431 is displayed in the second region of the display unit 161. The setting screen 311 is an image that is the same as the image displayed in the first region 351 shown in FIG. 11. The terminal image 431 includes instruction images 371A to 379A respectively corresponding to the nine pieces of character information 371 to 379 included in the terminal image 421 shown in FIG. 12. Although the instruction images 371A to 379A are indicated by rectangles of dotted lines, they are actually red rectangles when displayed.

Figure 14:
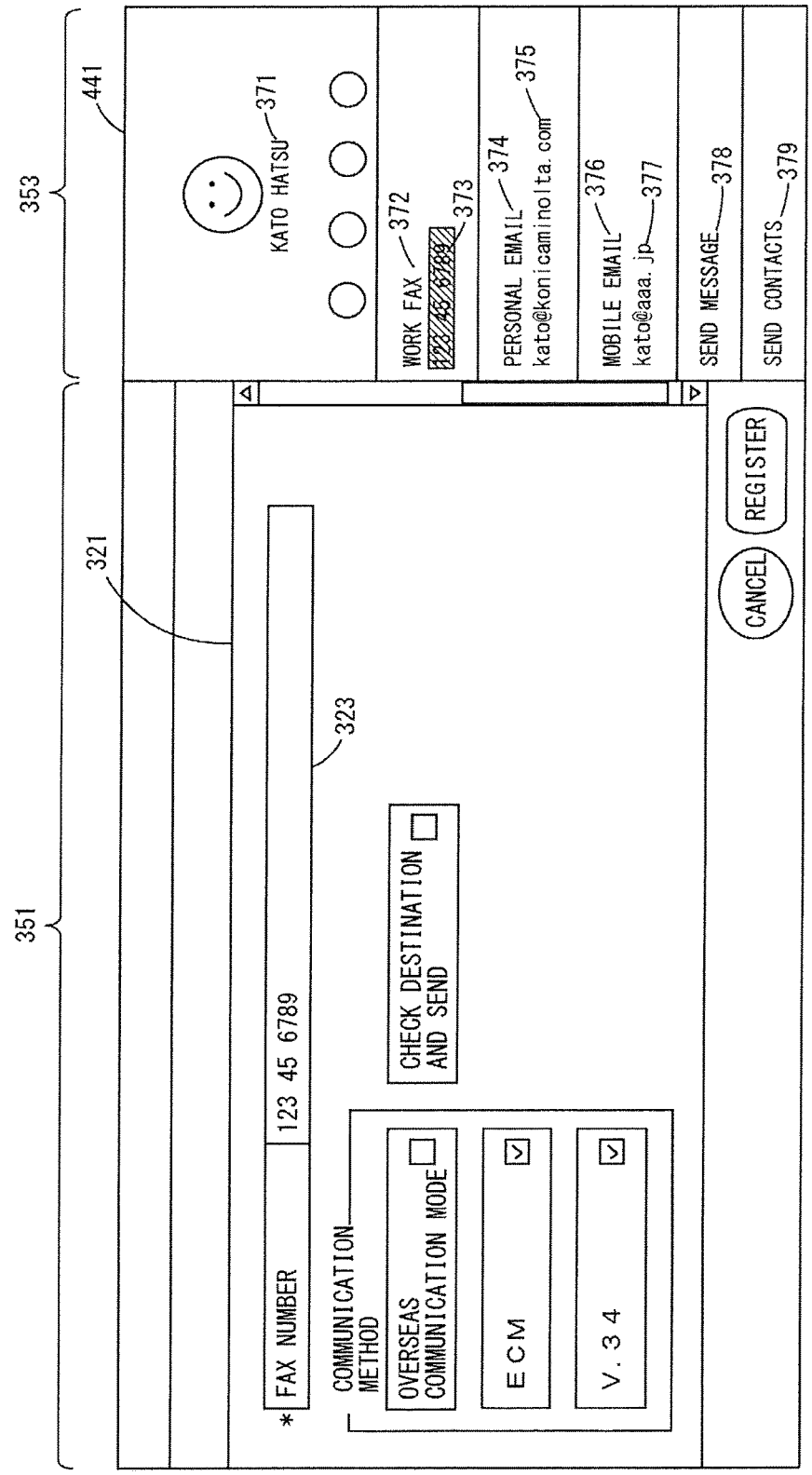
FIG. 14 is a fourth diagram showing one example of an image displayed in the MFP.

FIG. 14 is a fourth diagram showing one example of an image displayed in the MFP. In FIG. 14, with the image shown in FIG. 13 displayed in the display unit 161, an image displayed in the display unit 161 after the transition button in which "FAX" is displayed is designated by the user. Referring to FIG. 14, a setting screen 321 is displayed in the first region 351 of the display unit 161, and a terminal image 441 is displayed in the second region. The setting screen 321 is a screen for setting the facsimile number and includes a region 323 for inputting the facsimile number.

The terminal image 441 is an image, of the terminal image 431 shown in FIG. 13, from which the instruction image 371A is removed, and the character information 373 is highlighted. In FIG. 14, the highlight of the character information 373 is indicated by hatching. The highlight of the character information 373 may be a display mode that is different from a display mode of the other pieces of character information 371, 372, 374 to 379, for example. For example, a color or/size of the character information 371 may be different from the color and the size of the other pieces of character information. Further, a background around the character information 371 may be in a display mode different from display modes of the other parts.

When the transition button in which "FAX" is displayed is designated by the user with the image shown in FIG. 13 displayed, the setting screen 311 displayed in the first region 351 is switched to a setting screen 321, a character string "12345 6789" that is the same as the character information 373 is arranged in a region 323 of the setting screen 321, and the character string "12345 6789" is set as the facsimile number. Therefore, the facsimile number can be easily input in the region 323.

Figure 15:
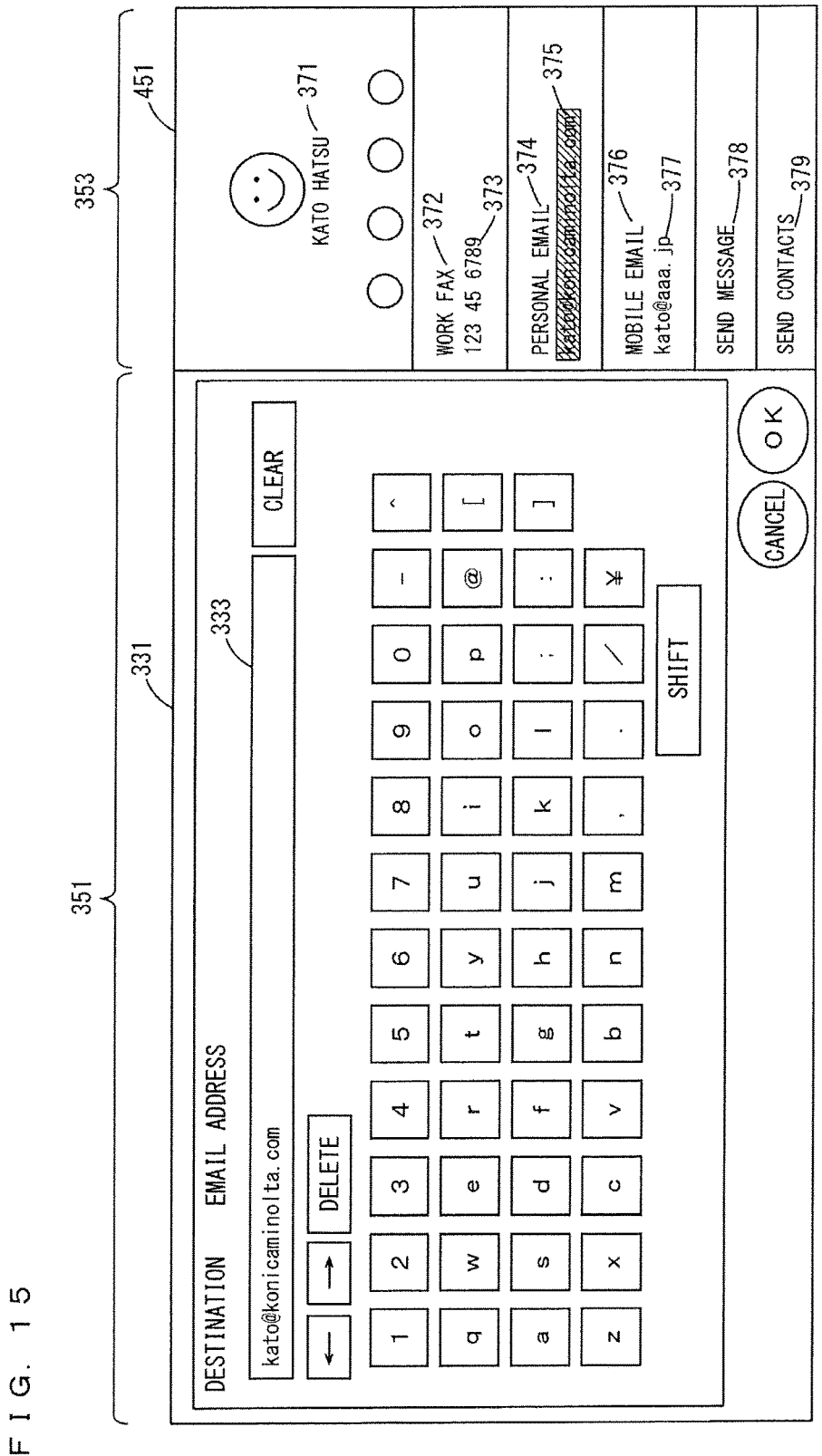
FIG. 15 is a fifth diagram showing one example of an image displayed in the MFP.

FIG. 15 is a fifth diagram showing one example of an image displayed in the MFP. In FIG. 15, with the image shown in FIG. 13 displayed in the display unit 161, an image displayed in the display unit 161 after the instruction image 375A is designated by the user is displayed. Referring to FIG. 15, a setting screen 331 is displayed in the first region 351 of the display unit 161, and a terminal image 451 is displayed in the second region in the display unit 161. The setting screen 331 is a screen for setting an email address and includes a region 333 for inputting the email address.

The terminal image 451 is an image, of the terminal image 431 shown in FIG. 13, from which the instruction image 371A is removed, and the character information 375 is highlighted. In FIG. 15, the highlight of the character information 375 is indicated by hatching. The highlight of the character information 375 may be a display mode that is different from a display mode of the other pieces of character information 371 to 374, 376 to 379, for example. For example, a color or/and size of the character information 375 may be different from the color or/and size of the other pieces of character information. Further, a background around the character information 375 may be in a display mode different from display modes of the other parts.

When the instruction image 375A is designated by the user with the image shown in FIG. 13 displayed, the setting screen 311 displayed in the first region 351 is switched to the setting screen 331, a character string "kato@konicaminolta.com" that is the same as the character information 375 is arranged in the region 333 of the setting screen 331, and the character string "kato@konicaminolta.com" is set as the email address. Therefore, the email address can be easily input.

As described above, the MFP 100 in the present embodiment functions as an image processing apparatus, acquires a terminal image displayed in the display unit 206 from the smartphone 200, and sets a setting value for executing a process based on a result of analysis of the terminal image. Therefore, the user can easily set setting values. Further, because a terminal image displayed in the display unit 206 is acquired from the smartphone 200, it is not necessary to install a specific application program that defines steps to operate in cooperation with the MFP 100 in the smartphone 200, and a general application program installed in the smartphone 200 may be executed in the smartphone 200. Therefore, setting values can be set in the MFP 100 with use of data stored in the general smartphone 200 in which the specific application program is not installed.

Further, the MFP 100 recognizes characters in the terminal image acquired from the smartphone 200 and acquires a string of one or more characters as one piece of character information. Thus, setting values can be extracted from the terminal image.

Further, the MFP 100 extracts candidate information, which is a candidate for a setting value, from among one or more pieces of character information acquired from the terminal image based on a type of the setting value used for a process to be executed, thereby being capable of extracting a candidate for the setting value for each type of a setting value used for a process executed by the MFP 100.

Further, the MFP 100 extracts the character information including predetermined characters corresponding to the type of the setting value as the candidate information, thereby being capable of extracting a candidate for the type of the setting value including the predetermined character.

Further, the MFP 100 extracts the character information including a predetermined character count, of characters, corresponding to the type of the setting value as the candidate information, thereby being capable of extracting a candidate, which is the setting value including the predetermined character count of characters.

Further, the MFP 100 extracts the character information, which is arranged at a predetermined relative position relative to the character information including a predetermined character string corresponding to the type of the setting value, as the candidate information, thereby being capable of extracting candidates corresponding to the type of the setting value.

Further, in the case where one piece of candidate information is extracted for one type, the MFP 100 determines that the one piece of candidate information is a setting value for the one type. Thus, the setting value can be automatically set.

Further, the MFP 100 determines a setting value corresponding to the type of the setting value defined in the setting screen displayed in the display unit 161. Thus, if the user performs an operation of displaying the setting screen, the setting value is set. Therefore, an operation of inputting setting values by the user can be simplified.

Further, in the case where the setting value is determined, if the setting screen for setting the setting value is not displayed in the display unit 206, the MFP 100 displays the setting screen for accepting the setting value. Thus, an operation of switching the setting screens by the user can be simplified.

Further, in the case where, when a region for inputting a setting value in the setting screen is selected by the user and a type of a setting value is specified, one of one or more pieces of character information acquired from a terminal image is selected by the user, the MFP 100 determines that the selected character information is the setting value. Therefore, it is not necessary for the user to input the setting value itself, so that the setting value can be easily input.

Further, because the MFP 100 analyzes the part designated by the user in a terminal image, an amount of data to be analyzed can be reduced. Thus, a process load can be reduced.

The MFP 100 has been described as one example of the image processing apparatus in the above-mentioned embodiments. However, it is needless to say that the present invention can be specified as a setting-value setting method for causing the MFP 100 to execute the setting-value setting process shown in FIGS. 8 to 10, or a setting-value setting program for causing the CPU 111 that controls the MFP 100 to perform the setting-value setting method.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus that is communicable with a portable device, comprising a hardware processor, wherein
the hardware processor
executes a process in accordance with a setting value,
displays a setting screen for setting the setting value,
acquires a terminal image displayed by the portable device,
analyzes the acquired terminal image with the terminal image displayed in the vicinity of the setting screen in a display, and
sets the setting value based on a result of analysis.

2. The image processing apparatus according to claim 1, wherein
the hardware processor recognizes characters in the acquired terminal image and acquires one or more character strings as one piece of character information.

3. The image processing apparatus according to claim 2, wherein
the hardware processor extracts candidate information that is a candidate for the setting value from among one or more pieces of acquired character information based on a type of the setting value.

4. The image processing apparatus according to claim 3, wherein
the hardware processor extracts character information including a predetermined character corresponding to the type of the setting value as the candidate information.

5. The image processing apparatus according to claim 3, wherein
the hardware processor extracts character information including a predetermined character count, of characters, corresponding to the type of the setting value as the candidate information.

6. The image processing apparatus according to claim 3, wherein
the hardware processor extracts character information arranged at a predetermined relative position relative to character information including a predetermined character string corresponding to the type of the setting value as the candidate information.

7. The image processing apparatus according to claim 3, wherein
the hardware processor determines the setting value based on the extracted candidate information.

8. The image processing apparatus according to claim 7, wherein
the hardware processor, in the case where one piece of candidate information is extracted for one type, determines that the one piece of extracted candidate information is a setting value corresponding to the one type.

9. The image processing apparatus according to claim 7, further comprising a display, wherein
the hardware processor
causes a setting screen, for accepting the setting value, among a plurality of setting screens to be displayed in the display, and
determines a setting value corresponding to the type of the setting value defined in the setting screen displayed in the display.

10. The image processing apparatus according to claim 7, further comprising a display, wherein
the hardware processor causes a setting screen, for receiving the determined setting value, among a plurality of setting screens to be displayed in the display.

11. The image processing apparatus according to claim 7, wherein
the hardware processor, in the case where the extracted candidate information is selected by the user with a type of the setting value specified, determines that the selected candidate information is the setting value.

12. The image processing apparatus according to claim 1, wherein
the hardware processor analyzes a part designated by the user in the acquired terminal image.

13. The image processing apparatus according to claim 1, wherein the terminal image is an image that includes personal information.

14. The image processing apparatus according to claim 13, wherein the personal information includes at least one of a fax number and an e-mail address.

15. A setting-value setting method that is performed by an image processing apparatus that is communicable with a portable device,
the setting-value setting method causing the image processing apparatus to:
execute a process in accordance with a setting value,
displays a setting screen for setting the setting value,
acquire a terminal image displayed by the portable device,
analyze the acquired terminal image with the terminal image displayed in the vicinity of the setting screen in a display, and
set the setting value based on a result of the analysis.

16. The setting-value setting method according to claim 15, further causing the image processing apparatus to perform character recognition of the acquired terminal image and acquire one or more character strings as one piece of character information.

17. The setting-value setting method according to claim 16, further causing the image processing apparatus to perform extraction of candidate information that is a candidate for the setting value from among the one or more pieces of acquired character information based on a type of the setting value.

18. The setting-value setting method according to claim 17, further causing the image processing apparatus to perform extraction of character information including a predetermined character corresponding to the type of the setting value.

19. The setting-value setting method according to claim 17, further causing the image processing apparatus to perform extraction of character information including a predetermined character count, of characters, corresponding to the type of the setting value as the candidate information.

20. The setting-value setting method according to claim 17, further causing the image processing apparatus to perform extraction of character information arranged at a predetermined relative position relative to character information including a predetermined character string corresponding to the type of the setting value as the candidate information.

21. The setting-value setting method according to claim 17, further causing the image processing apparatus to determine the setting value based on the extracted candidate information.

22. The setting-value setting method according to claim 15, wherein the terminal image is an image that includes personal information.

23. The setting-value setting method according to claim 22, wherein the personal information includes at least one of a fax number and an e-mail address.

24. A non-transitory computer-readable recording medium recording a setting-value setting program executed by a computer controlling an image forming apparatus that is communicable with a portable device,
the setting-value setting program causing the computer to:
execute a process in accordance with a setting value,
display a setting screen for setting the setting value,
acquire a terminal image displayed by the portable device,
analyze the acquired terminal image with the terminal image displayed in the vicinity of the setting screen in a display, and
set the setting value based on a result of the analysis.

25. The non-transitory computer-readable recording medium recording the setting-value setting program according to claim 24, wherein the terminal image is an image that includes personal information.

26. The non-transitory computer-readable recording medium recording the setting-value setting program according to claim 25, wherein the personal information includes at least one of a fax number and an e-mail address.

\* \* \* \* \*